(12) United States Patent
Sonn et al.

(10) Patent No.: US 11,512,002 B2
(45) Date of Patent: Nov. 29, 2022

(54) SILICA MATERIALS AND METHODS OF MAKING THEREOF

(71) Applicant: University of Virginia Patent Foundation, Charlottesville, VA (US)

(72) Inventors: Jong Ho Sonn, Charlottesville, VA (US); Pamela M. Norris, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 554 days.

(21) Appl. No.: 16/388,725

(22) Filed: Apr. 18, 2019

(65) Prior Publication Data

US 2019/0322535 A1 Oct. 24, 2019

Related U.S. Application Data

(60) Provisional application No. 62/659,185, filed on Apr. 18, 2018.

(51) Int. Cl.
| | |
|---|---|
| *C01B 33/155* | (2006.01) |
| *C01B 33/16* | (2006.01) |
| *C01B 33/158* | (2006.01) |
| *B01J 31/02* | (2006.01) |
| *B01J 27/02* | (2006.01) |
| *B01J 27/24* | (2006.01) |

(52) U.S. Cl.
CPC ............. *C01B 33/155* (2013.01); *B01J 27/02* (2013.01); *B01J 27/24* (2013.01); *B01J 31/0209* (2013.01); *C01B 33/1585* (2013.01); *C01B 33/166* (2013.01); *C01P 2006/12* (2013.01); *C01P 2006/14* (2013.01); *C01P 2006/16* (2013.01)

(58) Field of Classification Search
None
See application file for complete search history.

(56) References Cited

U.S. PATENT DOCUMENTS

| | | | |
|---|---|---|---|
| 4,988,617 A | 1/1991 | Landegren | |
| 5,242,794 A | 9/1993 | Whiteley et al. | |
| 5,395,805 A * | 3/1995 | Droege | B01J 13/0091 |
| | | | 423/594.17 |

(Continued)

OTHER PUBLICATIONS

Arenas et al (Synthesis of Silica Xerogels with High Surface Area using Acetic Acid as Catalyst, J. Braz. Chem. Soc. vol. 18, No. 5, (2007), 886-890). (Year: 2007).*

(Continued)

*Primary Examiner* — Colin W. Slifka
*Assistant Examiner* — Michael Forrest
(74) *Attorney, Agent, or Firm* — Meunier Carlin & Curfman LLC

(57) ABSTRACT

Disclosed herein are methods for the preparation of porous metal oxide materials, including metal oxide xerogels and metal oxide aerogels. Methods for preparing porous metal oxide materials can comprise (i) reacting a metal alkoxide with water in the presence of a catalyst system to form a partially hydrolyzed sol, (ii) contacting the partially hydrolyzed sol with a base catalyst and a non-aqueous solvent to form a precursor gel; and (iii) drying the precursor gel to form the porous metal oxide material. The catalyst system employed in step (i) comprises a combination of a weak acid and a strong acid.

19 Claims, 22 Drawing Sheets

(56) References Cited

U.S. PATENT DOCUMENTS

| | | | |
|---|---|---|---|
| 5,409,683 A * | 4/1995 | Tillotson | B01J 13/0091 |
| | | | 423/338 |
| 5,494,810 A | 2/1996 | Barany et al. | |
| 5,789,075 A * | 8/1998 | Frank | B01J 13/0091 |
| | | | 428/312.6 |
| 5,912,148 A | 6/1999 | Eggerding | |
| 6,130,073 A | 10/2000 | Eggerding | |
| 6,210,891 B1 | 4/2001 | Nyren et al. | |
| 6,258,568 B1 | 7/2001 | Nyren | |
| 6,582,938 B1 | 6/2003 | Su et al. | |
| 6,818,395 B1 | 11/2004 | Quake et al. | |
| 6,833,246 B2 | 12/2004 | Balasubramanian | |
| 6,911,345 B2 | 6/2005 | Quake et al. | |
| 6,969,488 B2 | 11/2005 | Bridgham et al. | |
| 7,115,400 B1 | 10/2006 | Adessi et al. | |
| 7,169,560 B2 | 1/2007 | Lapidus et al. | |
| 7,170,050 B2 | 1/2007 | Turner et al. | |
| 7,282,337 B1 | 10/2007 | Harris | |
| 7,302,146 B2 | 11/2007 | Turner et al. | |
| 7,313,308 B2 | 12/2007 | Turner et al. | |
| 7,315,019 B2 | 1/2008 | Turner et al. | |
| 7,329,492 B2 | 2/2008 | Hardin et al. | |
| 7,405,281 B2 | 7/2008 | Xu et al. | |
| 7,476,503 B2 | 1/2009 | Turner et al. | |
| 7,482,120 B2 | 1/2009 | Buzby | |
| 7,501,245 B2 | 3/2009 | Quake et al. | |
| 7,668,697 B2 | 2/2010 | Volkov et al. | |
| 10,093,966 B2 | 10/2018 | Satterfield | |
| 2007/0036511 A1 | 2/2007 | Lundquist et al. | |
| 2007/0072196 A1 | 3/2007 | Xu et al. | |
| 2007/0077564 A1 | 4/2007 | Roitman et al. | |
| 2007/0128133 A1 | 6/2007 | Eid et al. | |
| 2007/0134128 A1 | 6/2007 | Korlach | |
| 2007/0141598 A1 | 6/2007 | Turner et al. | |
| 2007/0161017 A1 | 7/2007 | Eid et al. | |
| 2007/0188750 A1 | 8/2007 | Lundquist et al. | |
| 2007/0196846 A1 | 8/2007 | Hanzel et al. | |
| 2007/0206187 A1 | 9/2007 | Lundquist et al. | |
| 2007/0231804 A1 | 10/2007 | Korlach et al. | |
| 2007/0238679 A1 | 10/2007 | Rank et al. | |
| 2008/0009007 A1 | 1/2008 | Lyle et al. | |
| 2008/0030628 A1 | 2/2008 | Lundquist et al. | |
| 2008/0032301 A1 | 2/2008 | Rank et al. | |
| 2008/0050747 A1 | 2/2008 | Korlach | |
| 2008/0080059 A1 | 4/2008 | Dixon et al. | |
| 2008/0095488 A1 | 4/2008 | Foquet et al. | |
| 2008/0108082 A1 | 5/2008 | Rank et al. | |
| 2008/0128627 A1 | 6/2008 | Lundquist et al. | |
| 2008/0145278 A1 | 6/2008 | Korlach | |
| 2008/0152280 A1 | 6/2008 | Lundquist et al. | |
| 2008/0152281 A1 | 6/2008 | Lundquist et al. | |
| 2008/0153095 A1 | 6/2008 | Williams et al. | |
| 2008/0153100 A1 | 6/2008 | Rank et al. | |
| 2008/0157005 A1 | 7/2008 | Lundquist et al. | |
| 2008/0160531 A1 | 7/2008 | Korlach | |
| 2008/0165346 A1 | 7/2008 | Lundquist et al. | |
| 2008/0176241 A1 | 7/2008 | Eid et al. | |
| 2008/0176316 A1 | 7/2008 | Eid et al. | |
| 2008/0176769 A1 | 7/2008 | Rank et al. | |
| 2008/0199874 A1 | 8/2008 | Otto et al. | |
| 2008/0199932 A1 | 8/2008 | Hanzel et al. | |
| 2008/0206764 A1 | 8/2008 | Williams et al. | |
| 2008/0212960 A1 | 9/2008 | Lundquist et al. | |
| 2008/0241951 A1 | 10/2008 | Battulga et al. | |
| 2009/0026082 A1 | 1/2009 | Rothberg et al. | |
| 2009/0035777 A1 | 2/2009 | Kokoris et al. | |
| 2009/0127589 A1 | 5/2009 | Rothberg et al. | |
| 2010/0137143 A1 | 6/2010 | Rothberg et al. | |
| 2010/0188073 A1 | 7/2010 | Rothberg et al. | |
| 2010/0197507 A1 | 8/2010 | Rothberg et al. | |
| 2010/0301398 A1 | 12/2010 | Rothberg et al. | |
| 2015/0321921 A1 * | 11/2015 | Zeng | C04B 14/064 |
| | | | 423/338 |
| 2018/0179073 A1 * | 6/2018 | Oh | B05D 1/18 |

OTHER PUBLICATIONS

Stolarski et al ("Synthesis and characteristic of silica aerogels", Appl. Cata. A: Gen. 177 (1999) 139-148). (Year: 1999).*

Crooke, Stanley T., Laurel S Bernstein, and Herb Boswell. "Section Review Biologicals & Immunologicals: Progress in the development and patenting of antisense drug discovery technology." Expert Opinion on Therapeutic Patents 6.9 (1996): 855-870.

De Mesmaeker, Alain, et al. "Backbone modifications in oligonucleotides and peptide nucleic acid systems." Current opinion in structural biology 5.3 (1995): 343-355.

Kanehisa, "Use of statistical criteria for screening potential homologies in nucleic acid sequences", 1984, pp. 203-213.

Korlach, Jonas, et al. "Selective aluminum passivation for targeted immobilization of single DNA polymerase molecules in zero-mode waveguide nanostructures." Proceedings of the National Academy of Sciences 105.4 (2008): 1176-1181.

MacLean, Daniel, Jonathan DG Jones, and David J. Studholme. "Application of next-generation'sequencing technologies to microbial genetics." Nature Reviews Microbiology 7.4 (2009): 287.

Maniatis, et al. (1982) Molecular Cloning: A Laboratory Manual, Cold Spring Harbor, N.Y. (see, e.g., pp. 280-281).

Margulies, Marcel, et al. "Genome sequencing in microfabricated high-density picolitre reactors." Nature 437.7057 (2005): 376.

Needleman, Saul B., and Christian D. Wunsch. "A general method applicable to the search for similarities in the amino acid sequence of two proteins." Journal of molecular biology 48.3 (1970): 443-453.

Pearson, William R., and David J. Lipman. "Improved tools for biological sequence comparison." Proceedings of the National Academy of Sciences 85.8 (1988): 2444-2448.

Pennisi, Elizabeth. "Semiconductors inspire new sequencing technologies." Science 327(5970): 1190 (2010).

Smith, T. F. and Waterman, M. S. (1981) Comparison of biosequences, Adv. Appl. Math. 2, 482-489.

Soni, Gautam V., and Amit Meller. "Progress toward ultrafast DNA sequencing using solid-state nanopores." Clinical chemistry 53.11 (2007): 1996-2001.

Uhlmann, Eugen, and Anusch Peyman. "Antisense oligonucleotides: a new therapeutic principle." Chemical Reviews 90.4 (1990): 543-584.

Voelkerding, Karl V., Shale A. Dames, and Jacob D. Durtschi. "Next-generation sequencing: from basic research to diagnostics." Clinical chemistry 55.4 (2009): 641-658.

Hoffmann and M. Fröba, "Vitalising porous inorganic silica networks with organic functions-PMOs and related hybrid materials," Royal Society of Chemistry, vol. 40, pp. 608-620, 2011.

Tillotson and L. Hurbesh, "Transparent ultralow-density silica aerogels prepared by a two-step sol-gel process," J. of Non-Crystalline Solids, vol. 145, pp. 44-50, 1992.

Hall and J. Conant, "A Study of Superacid Solutions," Journal of the American Chemical Society, vol. 49, 12, p. 3062-3070, 1927.

* cited by examiner

SILICA MATERIALS AND METHODS OF MAKING THEREOF

CROSS-REFERENCE TO RELATED APPLICATIONS

This application claims benefit of U.S. Provisional Application No. 62/659,185, filed Apr. 18, 2018, which is hereby incorporated herein by reference in its entirety.

BACKGROUND

Metal oxide aerogels are ultra-light, highly porous forms of metal oxide glass, with densities only slightly greater than air. The first aerogels, made in the 1930's, were scientific curiosities whose unique and strange properties were not immediately exploited for practical purposes. Decades later, aerogels found a practical application in a highly specialized area—the detection of charged particles in high-energy physics experiments. Today, the potential applications for aerogels are numerous and diverse. Their unique properties make them especially useful for a variety of applications that require transparency, low thermal conductivity, and strength with very low weight.

Aerogels are generally transparent and have a thermal conductivity about 100 times less than conventional non-porous glass. Because of their transparency and excellent insulating properties, aerogels could be used as superinsulating materials in walls, windows, refrigerators, boilers, boiler houses and steam pipes, or passive solar collectors. Aerogels also have mechanical strength and are good sound and shock absorbers. Sound transmission through aerogels is slower than through air, and the acoustic impedance of aerogels falls between that of most sound transducers and air. Aerogels could be used to improve the efficiency of transducers used in micro-speakers and distance ranging. Aerogels have low dielectric losses and would make excellent substrates and supports for electronic circuits, especially microwave.

The extremely low densities of aerogels, coupled with their mechanical strength, suggest a host of applications as materials for engine and body parts of automobiles, aircraft, and spacecraft. Aerogels would be useful as packaging materials and have the added advantage of being environmentally friendly and non-toxic, unlike typical plastics and Styrofoam, which release CFCs. Aerogels also have a smoky, ghostly appearance and can be colored with dopants, lending an aesthetic quality to the materials that is desirable for more artistic uses, such as novelty or craft items, and toys. These dispersed dopants could have useful applications in which the aerogel acts as a host matrix. Examples include dye doped aerogels, which could be used as laser rods, and metal doped aerogels, which could catalyze specific chemical reactions.

Two general reactions are used to make metal (M) oxide aerogels:

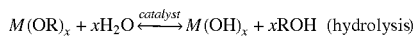
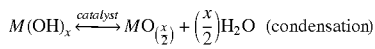

A metal alkoxide is hydrolyzed by reacting with water and an alcohol in the presence of a catalyst. The hydrolyzed metal undergoes a condensation reaction, forming a metal oxide gel, from which solvents are extracted to form an aerogel.

The first aerogels were translucent pieces of porous silica glass. The aerogels were prepared by forming silica 'hydrogels', which were exchanged with alcohol and dried with little shrinkage. When the alcohol was supercritically extracted from the wet gel at high temperatures and pressures, the resulting aerogel had a density of about 0.05 g/cm$^3$, or 98% porosity. However, this process was time consuming and laborious.

Subsequent efforts have attempted to reduce the processing time and/or increase the quality of aerogels. However, there is still a need for improved methods for the synthesis of porous metal oxide materials such as aerogels.

SUMMARY

Disclosed herein are methods for the preparation of porous metal oxide materials, including metal oxide xerogels and metal oxide aerogels.

Methods for preparing porous metal oxide materials can comprise (i) reacting a metal alkoxide with water in the presence of a catalyst system to form a partially hydrolyzed sol, (ii) contacting the partially hydrolyzed sol with a base catalyst and a non-aqueous solvent to form a precursor gel; and (iii) drying the precursor gel to form the porous metal oxide material.

The catalyst system employed in step (i) comprises a combination of a weak acid and a strong acid. The weak acid and the strong acid can be present in a molar ratio of weak acid:strong acid of from 1:1 to 200:1 (e.g., a ratio of from 1:1 to 100:1, a ratio of from 1:1 to 75:1, a ratio of from 2:1 to 70:1, or a ratio of from 4:1 to 70:1). In some cases, the weak acid can comprise acetic acid. In some cases, the strong acid can comprise nitric acid, sulfuric acid, or a combination thereof.

In certain embodiments, the metal alkoxide can comprise a silicon alkoxide (e.g., tetramethoxysilane, tetraethoxysilane, tetrapropoxysilane, tetrabutoxysilane, or a combination thereof). The molar ratio of the water and the metal oxide can be varied. In some embodiments, the water and the metal alkoxide can be present in a molar ratio of water:metal alkoxide of from 2:1 to 5:1.

Step (i) can be performed at mild temperatures. For example, in some embodiments, step (i) can comprise reacting the metal alkoxide with the water in the presence of the catalyst system at a temperature of 50° C. or less (e.g., 40° C. or less, or 30° C. or less). In certain embodiments, step (i) can comprise reacting the metal alkoxide with the water in the presence of the catalyst system at room temperature (e.g., a temperature of from 20° C. to 25° C.).

The metal oxide content of the partially hydrolyzed sol formed in step (i) can vary. In some embodiments, the partially hydrolyzed sol can comprise at least 10 wt % silica, at least 15 wt % silica, or at least 20 wt % silica, based on the total weight of the partially hydrolyzed sol. In certain embodiments, the partially hydrolyzed sol can comprise from 15 wt % silica to 30 wt % silica, based on the total weight of the partially hydrolyzed sol.

Step (ii) can comprise contacting the partially hydrolyzed sol with a base catalyst and a non-aqueous solvent for a period of less than three hours (e.g., for a period of less than two hours, or for a period of less than one hour) at room temperature (e.g., a temperature of from 20° C. to 25° C.).

In some examples, the base can comprise ammonium hydroxide. In some examples, the non-aqueous solvent can comprise an alcohol, such as methanol, ethanol, propanol, or butanol.

Optionally, the precursor gel can be aged, rinsed, or a combination thereof prior to drying. For example, in some embodiments, the precursor gel can be aged in an alcohol solution containing a functionalization agent such as 1,1,1,3,3,3-hexamethyldisilazine. The functionalization agent can covalently react with the precursor gel, for example, to modulate the hydrophobicity/hydrophilicity of the precursor gel (and by extension the resulting porous metal oxide material). In some embodiments, the precursor gel can be rinsed, for, example, with an alcohol solution.

The resulting morphology of precursor gel (and by extension the resulting porous metal oxide material) can be varied by selection of appropriate reagents, reagent quantities, and process conditions. In this way, various precursor gels can be formed. For example, the precursor gel can comprise a film, a polymeric gel, or a colloidal gel.

Once formed, the precursor gel can be dried using any suitable means. Appropriate methods for drying the precursor gel can be selected in view of a number of factors, including the morphology of the precursor gel and the desired characteristics (e.g., desired porosity) of the porous metal oxide material. In certain embodiments, drying the precursor gel can comprise supercritically drying the precursor gel. Methods can also comprise calcining the supercritically dried precursor to remove chemical residues.

DESCRIPTION OF DRAWINGS

FIG. 15A: 50,000, FIG. 15B: 250,000).

FIG. 16A: 50,000, FIG. 16B: 250,000).

DETAILED DESCRIPTION

Definitions

Figure 1:
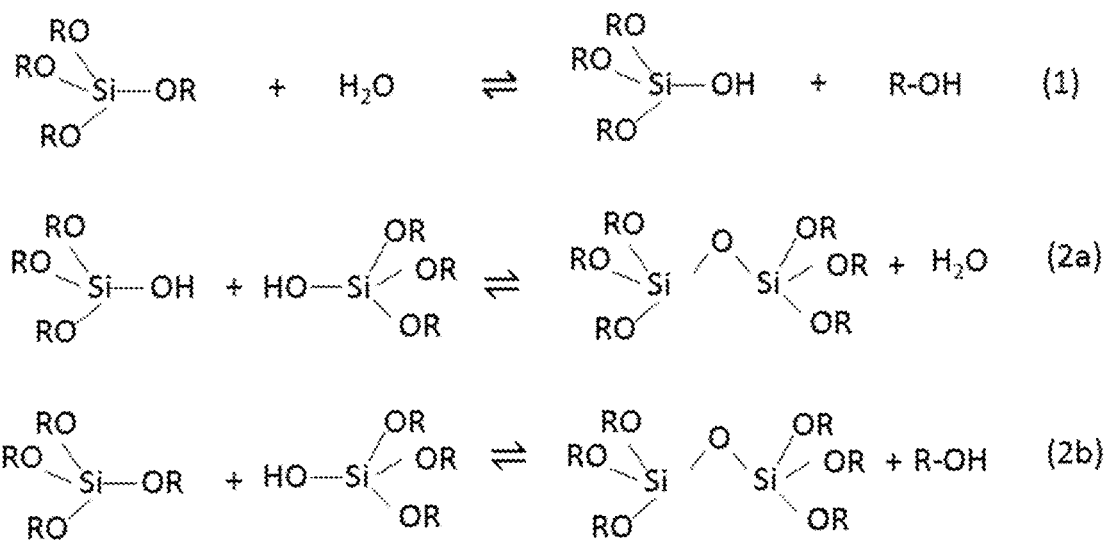
FIG. 1 illustrates the three main reaction steps occurring in the two step sol-gel process of alkoxysilanes: (1) hydrolysis of an alkoxy group produces silanol groups and the respective alcohol; (2a) condensation of two silanol bearing species; and (2b) mixed condensation of a silanol group and an alkoxy group bearing species.

The term "aerogel," as used herein, refers to that which remains when the liquid portion of a sol-gel like material is removed without damaging the solid part (most often achieved by supercritical extraction). If made correctly, the aerogel retains the original shape of the sol-gel like material and at least 50% (typically>85%) of the sol-gel like material's volume.

The term "condensation," as used herein, refers to a reaction that occurs when two metal hydroxides (M-OH+ HO-M) combine to give a metal oxide species (M-O-M). The reaction forms one water molecule.

The term "gel point," as used herein, refers to the point in time at which the network of linked oxide particles spans the container holding the Sol. At the gel point the Sol becomes a sol-gel like material.

The term "hydrolysis," as used herein, refers to the reaction of a metal alkoxide (M-OR) with water, forming a metal hydroxide (M-OH).

The term "sol," as used herein, refers to a solution of various reactants that are undergoing hydrolysis and condensation reactions. The molecular weight of the oxide species produced continuously increases. As these species grow, they may begin to link together in a three-dimensional network.

The term "sol-gel like material," as used herein, refers to a material that results from a sol-gel process as is known in the art and described herein. For example, a sol-gel forms a rigid substance called a sol-gel like material. The sol-gel like material can be removed from its original container and can stand on its own. A sol-gel like material consists of two parts, a solid part and a solvent part. The solid part is formed by the three-dimensional network of linked oxide particles. The solvent part fills the free space surrounding the solid part. The solvent and solid parts of a sol-gel like material occupy the same apparent volume. A sol-gel like material that is substantially filled with a solvent refers to a sol-gel material that is filled with at least about 75%, 80%, 90%, 95%, or 98% solvent by volume.

The term "supercritical fluid," as used herein, refers to a substance that is above its critical pressure and critical temperature. A supercritical fluid possesses some properties in common with liquids (density, thermal conductivity) and some in common with gases (fills its container, does not have surface tension).

Methods of Making Porous Metal Oxide Materials

Disclosed herein are methods for the preparation of porous metal oxide materials, including metal oxide xerogels and metal oxide aerogels.

Methods for preparing porous metal oxide materials can comprise (i) reacting a metal alkoxide with water in the presence of a catalyst system to form a partially hydrolyzed sol, (ii) contacting the partially hydrolyzed sol with a base catalyst and a non-aqueous solvent to form a precursor gel; and (iii) drying the precursor gel to form the porous metal oxide material.

The catalyst system employed in step (i) comprises a combination of a weak acid and a strong acid. The relative amounts of weak acid and strong acid can be varied.

In some embodiments, weak acid and the strong acid can be present in a molar ratio of weak acid:strong acid of at least 1:1 (e.g., at least 2:1, at least 4:1, at least 5:1, at least 10:1, at least 15:1, at least 20:1, at least 25:1, at least 30:1, at least 35:1, at least 40:1, at least 45:1, at least 50:1, at least 55:1, at least 60:1, at least 65:1, at least 70:1, at least 75:1, at least 80:1, at least 85:1, at least 90:1, at least 95:1, at least 100:1, at least 125:1, at least 150:1, or at least 175:1). In some embodiments, weak acid and the strong acid can be present in a molar ratio of weak acid:strong acid of 200:1 or less (e.g., 175:1 or less, 150:1 or less, 125:1 or less, 100:1 or less, 95:1 or less, 90:1 or less, 85:1 or less, 80:1 or less, 75:1 or less, 70:1 or less, 65:1 or less, 60:1 or less, 55:1 or less, 50:1 or less, 45:1 or less, 40:1 or less, 35:1 or less, 30:1 or less, 25:1 or less, 20:1 or less, 15:1 or less, 10:1 or less, 5:1 or less, 4:1 or less, or 2:1 or less).

The weak acid and the strong acid can be present in a molar ratio ranging from any of the minimum values described above to any of the maximum values described above. For example, in some embodiments, the weak acid and the strong acid can be present in a molar ratio of weak acid:strong acid of from 1:1 to 200:1 (e.g., a ratio of from 1:1 to 100:1, a ratio of from 1:1 to 75:1, a ratio of from 2:1 to 70:1, or a ratio of from 4:1 to 70:1).

The catalyst system can comprise any suitable weak acid and strong acid. In some cases, the weak acid can comprise a carboxylic acid (e.g., acetic acid, propionic acid, butyric acid, citric acid). In certain embodiments, the weak acid can comprise acetic acid. The strong acid can comprise any suitable strong acid, such as hydrochloric acid (HCl), sulfuric acid ($H_2SO_4$), or nitric acid ($HNO_3$). In some cases, the strong acid can comprise nitric acid, sulfuric acid, or a combination thereof.

The methods described herein can be used to form porous materials with any metal that can form an alkoxide. Examples of metals that form alkoxides include silicon, germanium, tantalum, zirconium, boron, titanium, iron, magnesium, strontium, praseodymium, erbium, cerium, lithium, and aluminum. Examples of metal alkoxides include $Ge(OC_2H_5)_4$, $Ta(OC_3H_7)_4$, $Zr(OC_3H_7)_4$, $B(OCH_3)_5$, $Ti(OC_2H_5)_4$, $Al(sec\text{-}butoxide)_3$, $Si(OCH_3)_4$, $Si(OC_2H_5)_4$, $Fe(OC_2H_5)_3$, and $Li(OCH_3)$. In certain embodiments, the metal alkoxide can comprise a silicon alkoxide (e.g., tetramethoxysilane, tetraethoxysilane, tetrapropoxysilane, tetrabutoxysilane, or a combination thereof). Mixtures of metal alkoxides can also be utilized.

In some cases, the metal alkoxide can be highly purified (e.g., at least 98%). This high purity assures that a negligible amount of water will be introduced to the starting mixture by the metal alkoxide reagent, and that the metal alkoxide has not already reacted with atmospheric water to form low molecular weight oligomers. Additionally, high purity starting reagents allows for the molar ratio of water and metal alkoxide to be carefully controlled. This can be desirable, as the molar ratio of water and metal alkoxide is a factor in determining the final aerogel microstructure.

The molar ratio of the water and the metal oxide can be varied. In some embodiments, the water and the metal alkoxide can be present in a molar ratio of water:metal alkoxide of from 2:1 to 5:1 (e.g., from 2:1 to 4.83:1, or from 2:1 to 4:1).

Step (i) can be performed at mild temperatures. For example, in some embodiments, step (i) can comprise reacting the metal alkoxide with the water in the presence of the catalyst system at a temperature of 50° C. or less (e.g., 40° C. or less, or 30° C. or less). In certain embodiments, step (i) can comprise reacting the metal alkoxide with the water in the presence of the catalyst system at room temperature (e.g., a temperature of from 20° C. to 25° C.).

The metal oxide content of the partially hydrolyzed sol formed in step (i) can vary. By varying the metal oxide content (density) of the partially hydrolyzed sol, the morphology of the of precursor gel (and by extension the resulting porous metal oxide material) can be tailored. In some embodiments, the partially hydrolyzed sol can comprise at least 10 wt % silica, at least 15 wt % silica, or at least 20 wt % silica, based on the total weight of the partially hydrolyzed sol. In certain embodiments, the partially hydrolyzed sol can comprise from 15 wt % silica to 30 wt % silica, based on the total weight of the partially hydrolyzed sol.

Step (ii) can comprise contacting the partially hydrolyzed sol with a base catalyst and a non-aqueous solvent for a period of less than three hours (e.g., for a period of less than two hours, or for a period of less than one hour) at room temperature (e.g., a temperature of from 20° C. to 25° C.).

Any suitable base catalyst can be used. Examples of suitable base catalysts are known in the art, and include ammonium hydroxide, potassium hydroxide, sodium hydroxide, and combinations thereof. In some examples, the base can comprise ammonium hydroxide.

The non-aqueous solvent can comprise any suitable water-miscible solvent. In some examples, the non-aqueous solvent can comprise an alcohol, such as methanol, ethanol, propanol, or butanol. In certain embodiments, the non-aqueous solvent can be the same alcohol that serves as the alkoxide ligands on the metal alkoxide used in step (i). For example, in some embodiments, the metal alkoxide can comprise ethoxy ligands, and the non-aqueous solvent can comprise ethanol.

Optionally, the precursor gel can be aged, rinsed, or a combination thereof prior to drying. For example, in some embodiments, the precursor gel can be aged in an alcohol solution containing a functionalization agent, such as 1,1,1,3,3,3-hexamethyldisilazine. The functionalization agent can covalently react with the precursor gel, for example, to modulate the hydrophobicity/hydrophilicity of the precursor gel (and by extension the resulting porous metal oxide material). In some embodiments, the precursor gel can be rinsed, for, example, with an alcohol solution.

The resulting morphology of precursor gel (and by extension the resulting porous metal oxide material) can be varied by selection of appropriate reagents, reagent quantities, and process conditions. In this way, various precursor gels can be formed. For example, the precursor gel can comprise a film, a polymeric gel, or a colloidal gel. If desired, the precursor gel can be cast, that is, formed in a mold.

Once formed, the precursor gel can be dried using any suitable means. Appropriate methods for drying the precursor gel can be selected in view of a number of factors, including the morphology of the precursor gel and the desired characteristics (e.g., desired porosity) of the porous metal oxide material.

Methods for drying the precursor gel are known in the art, and include supercritical extraction, freeze drying, or evaporation. Solvent can be supercritically extracted by one of two methods: direct supercritical extraction of solvent, or substitution of solvent with a liquefied gas, which is then supercritically extracted.

In the direct supercritical extraction process, solvent can be removed without causing large capillary forces, which may collapse the gel structures. In these methods, the wet precursor gel is placed in a reaction vessel and subjected to elevated temperatures (e.g., in the range of 250° C.-315° C.) and elevated pressures (e.g., 1500-2000 psi) which are sufficient to raise the solvent above its critical point. The supercritical vapor is then released from the vessel, and the dried aerogel is cooled to room temperature with flowing air.

An inert gas may be added to the vessel to provide collateral pressure to achieve the critical pressure of the solvent. The inert gases suitable to provide pressure include argon and nitrogen. The use of an inert gas limits the amount of solvent needed to produce supercritical pressure conditions.

In the second method of extraction, solvent is exchanged with a liquefied gas, which is then supercritically extracted. Gases suitable for this substitution include carbon dioxide, propane, and chlorofluorocarbons (CFCs or freons).

The structure and surfaces of low-density aerogels are generally best preserved and stabilized against the effects of moisture during direct removal of the solvent under supercritical conditions, whereby the surface hydroxyl groups are esterified. The direct removal of solvent produces an aerogel with a hydrophobic surface character. Direct supercritical extraction does not require a late step replacement of solvents after gel formation is complete and therefore conserves time in producing the finished aerogel product.

Substitution of the solvent for a liquefied gas before supercritical extraction produces an aerogel that is hydrophilic and as such absorbs moisture when exposed to humid air. Replacement of the solvent after gel formation is especially detrimental for ultralow density aerogels and causes irreversible shrinkage when exposed to atmospheric conditions. However, if a hygroscopic aerogel is desired, then supercritical extraction of a liquefied gas solvent is a suitable method.

Following solvent removal, the dried gel can be calcined to remove chemical residues. For example, the dried gel can be heated at a temperature of from 80° C. to 150° C. (e.g., 100° C. to 120° C.).

If increased hydrophobicity of the porous material is desired, alkyl groups such as ethyl, propyl, butyl, and preferably methyl, can be incorporated into the porous material by reacting the porous material with a functionalization agent. Examples of such functionalization agents include, for example, trimethylchlorosilane, trimethylbromosilane, dimethylethylchlorosilane, dimethylpropylchlorosilane, dimethyldichlorosilane, tricholoromethylsilane, dimethylethylbromosilane, tricholoroethylsilane, trichloropropylsilane, triethylchlorosilane, tripropylchlorosilane, tributylchlorosilane, dimethylethylbromosilane, dimethylpropylbromosilane, dimethylbutylchlorosilane, dimethylbutylbromosilane, dichloromethylsilane, dichloroethylysilane, dichloropropylsilane, dichlorobutylsilane, dibromomethylsilane, dibromoethylsilane, dibromopropylsilane and dibromobutylsilane.

By way of non-limiting illustration, examples of certain embodiments of the present disclosure are given below.

EXAMPLES

Example 1: Sol-Gel Route for Silica Aerogel Synthesis: Direct-Contact Method (DCM)

This example describes a new sol-gel process, referred to herein as the "direct-contact method" (DCM). This production route constitutes an improvement over traditional two-step sol-gel process used to synthesize silica gels. In the DCM, the pre-hydrolysis step is modified to increase controllability of the processing conditions to tailor the final product as various types of silica aerogel. Details and discussion of this new sol-gel method are provided after motivation for the development is first given. Finally, the differences between the DCM process and the conventional process are summarized, and some of the benefits of the DCM process are discussed.

Motivation for Process Development

Over the last two decades, the two-step sol-gel process has been broadly used to produce silica aerogels. In these two-step methods, the hydrolysis and the polycondensation of the sol-gel can be separately controlled by using an acid catalyst and a base catalyst respectively. It is important to control the two reaction rates relatively to synthesize a polymeric wet gel, as a gel is formed only when the relative reaction rate of the condensation is considerably higher than that of the hydrolysis (FIG. 1).

Conventional methods for hydrolysis of silica precursors in the two step acid-base catalysis system includes diluting the precursor in its mother liquor prior to adding under-stoichiometric amounts of water and an acid catalyst to form pre-hydrolyzed silanol groups [$Si(OR)_3(OH)$] and silica sol [$Si(OH)_4$]. However, this method, in many cases, is time extensive and an energy-consuming process. The solution needs to be heated up and cooled down to enhance the hydrolysis rate and to stabilize the state of the sol, respectively. This approach also yields relatively slow gelation due to the low concentration of the active silanol groups by only partial hydrolysis of the precursor. While it is common for most metal alkoxides to have high reaction rates for hydrolysis, the uncommonly low hydrolysis reaction rate of silicon alkoxide is a disadvantage when a silica sol-gel reaction is considered as the production process for any silica products. The extra amount of water and solvent lower the silica content in the produced sol batch and thus also increase the production costs, as this limits the concentration of the final product. Also, the adaptability of the conventional sol-gel process to other processes which might be used to produce hybrid materials or to co-gel with other species is low, so this must be considered as the diversity of the types of sol-to-gel products desired for various applications increases rapidly.

Direct-Contact Method (DCM)

Figure 2A:
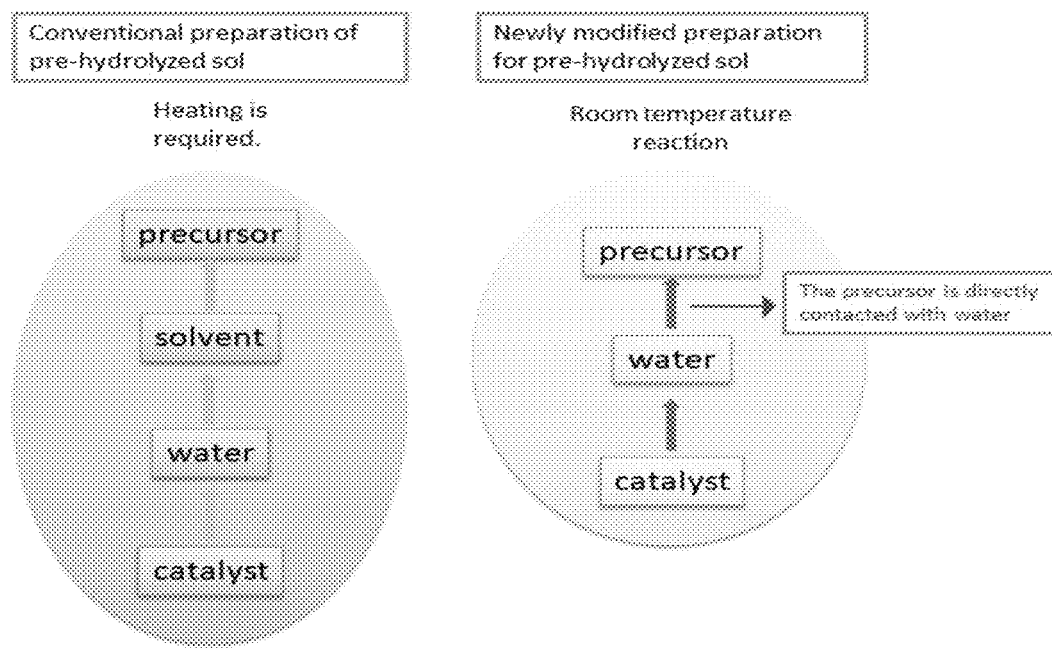
FIG. 2A shows a schematic comparison of conventional pre-hydrolysis and the direct-contact method (DCM) hydrolysis.

Presented here is a new process for producing aerogels, both silica and hybrids. In this process, an alkoxysilane (e.g., TEOS or TMOS) is pre-hydrolyzed by the precursor-water direct-contact method (DCM) in order to control the gelation time across a broad range from a few minutes to hours. The idea of the DCM is to let the precursor and water mix without an additional diluent, so the contact rate of water and silane groups increases. However, this was previously believed to be impossible due to the poor miscibility of the silicon alkoxide with water, which also results in very low reactivity towards hydrolysis reactions even in the presence of excessive stoichiometric amounts of water. FIG. 2A briefly shows the differences between the main concepts in the conventional two step sol-gel process and the DCM.

Description of the Developed Process.

In order to overcome the difficulty resulting from the poor miscibility of the silicon alkoxide with water in silica sol-gel chemistry and in order to produce silanol groups [silica sol, $Si(OR)_3(OH)$] which are polymeric and homogeneously formed, the pH of the reaction system needs to be adjustable as the hydrolysis reaction proceeds. The silicon alkoxide (TEOS in this case) shows relatively high reaction rates of hydrolysis at strong acidic conditions (at or below pH 2.0) and strong basic conditions (at or near pH 14.0). Based on this property, the DCM was initiated by sequentially applying a dual catalyst system of strong acid as the main catalyst and weak acid as a supplementary one. The strong acid catalyzes the hydrolysis reaction while the weak acid drives a gradual change of the pH so the hydrolysis occurs homogeneously and simultaneously in the reaction system. The control of the pH change also increases the miscibility of the TEOS and water by releasing negative ions that promote the deprotonation of the water. This results in hydrolysis within a few hours when the catalysts are added. In addition, the higher concentration of Si in the pre-hydrolyzed sol yields a wider range over which the target density of the synthesized gel can be controlled.

Figure 2B:
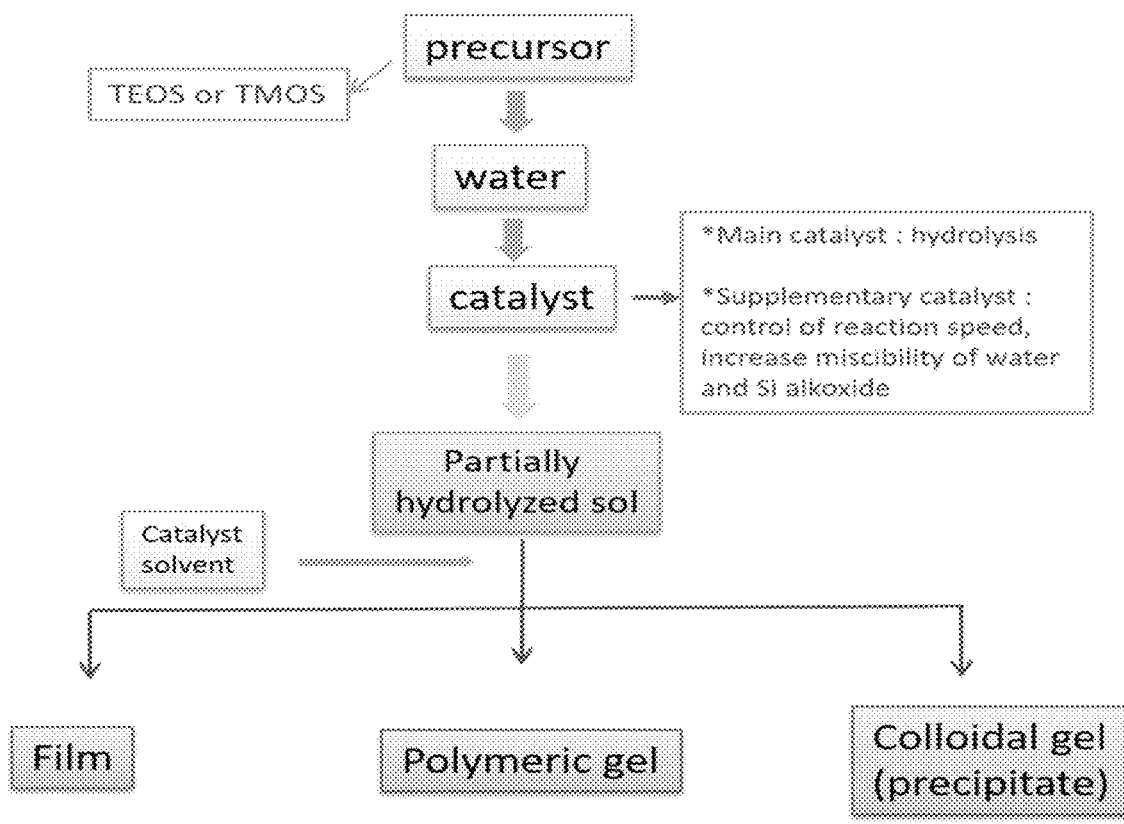
FIG. 2B shows an example of the two-step sol-gel process by employing the DCM and resultant products.

FIG. 2B shows the whole sol-gel pathway when the conventional two-step process is replaced with the DCM and the possible types of final products resulting when the gelation proceeds under appropriate conditions. When the final product is a film or a colloidal gel, the water amount can be adjusted at under and over-stoichiometric ratios to the precursor, respectively. This adjustment can be conveniently made in the pre-hydrolysis step or the gelation step in the DCM. Gel films, in many cases, are produced on a substrate and this requires a certain portion of open chain hydroxyl (—OH) groups where durable bonding is made between the substrate (often glass or boron silicate) and the film layer. Such hydroxyl groups can be obtained by reacting the silica precursor with under-stoichiometric amounts of water in the hydrolysis process so that the condensation is incomplete with some quantity of silanol remaining unreacted. The colloidal gel is produced when the hydrolysis rate is overwhelmingly increasing relative to the condensation rate during the sol-to-gel step. This is mainly caused by providing over-stoichiometric amounts of water and the final product is the result of precipitation, due to the early termination of gelation before the silica network is maximized to the entire volume of the reaction system (solvent). This also causes irregular formation of the silica network in size and shape. The polymeric gel is made when the hydrolysis is driven by stoichiometric amount of water that is accurately adjusted. This hydrolysis produces a clear silica sol, which means the sizes of the hydrolyzed sols are smaller than what is influenced by van der Walls forces. This small size enables homogeneous distribution of the silica sols throughout the reaction system (the liquid batch where the hydrolysis occurs). When the hydrolysis is nearly completed, the condensation reaction is driven to connect the silica sols to form the silica networks. These silica networks are crosslinked three dimensionally, and result in highly homogeneous and open pores between them.

Selection of Catalysts.

An important step in development of the DCM was the patient investigation of the potential combinations of acid catalysts. The catalyst combination ideally meets one or more of the following criteria:

1. Sufficient increase in the miscibility of the silica alkoxide and water without a solvent.
2. Drives homogeneous hydrolysis at room temperature.
3. The produced sol is ready for the next step (gelation) within the time that is appropriate for process implementation regardless of its scale.
4. The produced sol has reasonable pot life time so that it can be stable until the entire sol-gel process is completed.
5. The selected catalysts are inexpensive and broadly used so there are no safety issues that arise.

The combination of catalysts can be a strong acid-weak acid pair as discussed above. For purposes of initial investigation, hydrochloric acid, nitic acid, and sulfuric acid were selected as example strong acids, and acetic acid was selected as an example weak acid. Pairs of nitric acid-acetic acid and sulfuric acid-acetic acid were further selected in this example for the further investigation, where the relative molar ratios of the paired catalysts, silica precursor (TEOS), and water were adjusted. Hydrochloric acid was not selected for further investigation at this time due to concerns regarding its fumes and its high corrosiveness; however, it could be similarly investigated.

Quantitative Definition of Each Composition.

Table 1 shows the resulting ranges of each composition of the DCM where the homogeneous sol was synthesized. While these ranges are defined to be employed to produce monolithic silica aerogel, it is believed that a much broader range in molar ratio can be defined for the same compositions when other types of gels need to be produced.

TABLE 1

Investigation results on optimized relative molar ratio of involved compositions in the DCM.

| Involved composition | TEOS | Water | nitric acid (sulfuric acid) | acetic acid |
|---|---|---|---|---|
| Relative molar ratio | 1 | 2.00~4.83 | $5.0 \times 10^{-4}$~$1.0 \times 10^{-3}$ ($6.0 \times 10^{-4}$~$1.2 \times 10^{-3}$) | $2.0$~$3.5 \times 10^{-2}$ |

The adjusted molar ratios dynamically affect the reaction time, the pot life time, the morphology of the gel via gelation, and the porosity of the produced aerogel. When the molar ratio of water is used at a value close to the lower limit (2.00), homogeneous hydrolysis occurs earlier but the gelation time increases under the same condition because fewer silanol groups are involved in the poly condensation (gelation). Use of lower concentrations of catalysts (lower limit in Error! Reference source not found.) requires longer reaction times to reach the homogeneous hydrolysis but results in longer pot life time so the produced sol can be stored and available to produce gel products for longer periods of time.

Throughout the investigation process, it was noted that the relative molar ratio of the combination of catalysts was important as they react with each other, as well as the remainder of the reactants. Only certain ranges of the molar ratio provided for the miscibility of water with the silica alkoxide (TEOS) to be increased and reach the homogeneous hydrolysis where the milky mixture becomes clear. When the molar ratio is outside this range, the hydrolysis occurs inhomogeneously so the solution either remains cloudy or it is once clarified but returns to a cloudy state due to failure of pH control by the catalysts. In this example, the molar ratio of nitric acid-acetic acid combination and sulfuric acid-acetic acid combination were adjusted to 0.029 and 0.035, respectively.

Observation of the DCM Process.

Figure 3:
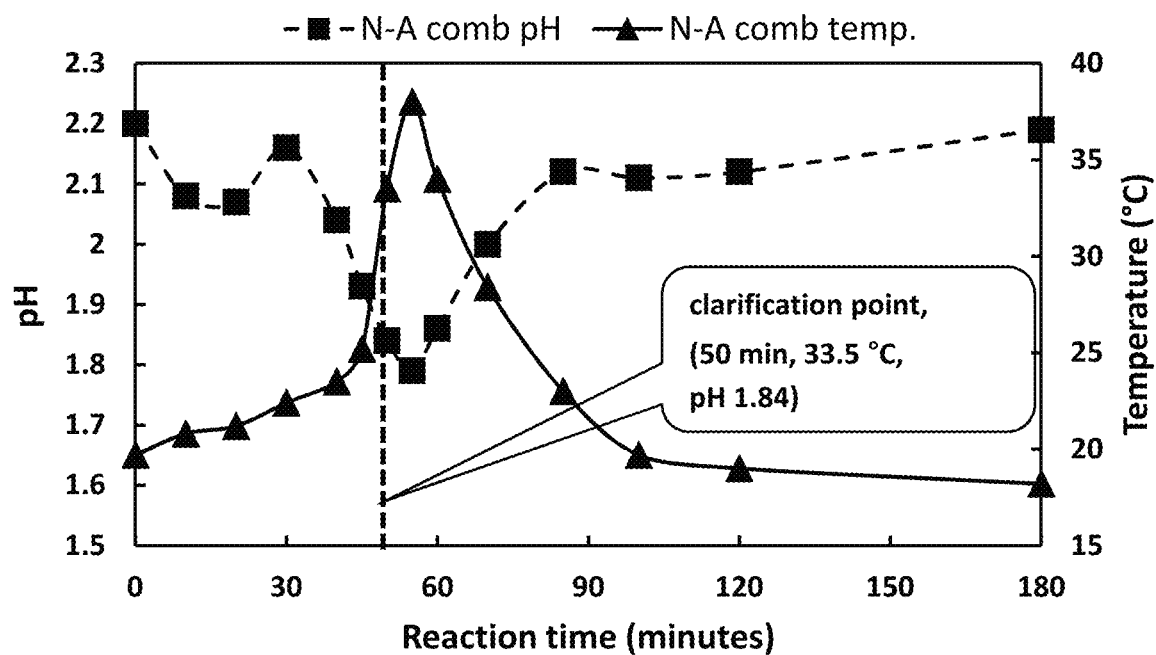
FIG. 3 illustrates the pH and temperature profile of the hydrolysis reaction of TEOS by the direct-contact method (DCM) when nitric acid and acetic acid catalyzed the hydrolysis. The molar ratio of TEOS:water:nitric acid:acetic acid is $1:4.83:1.0\times10^{-3}:3.5\times10^{-2}$, respectively.
Figure 4:
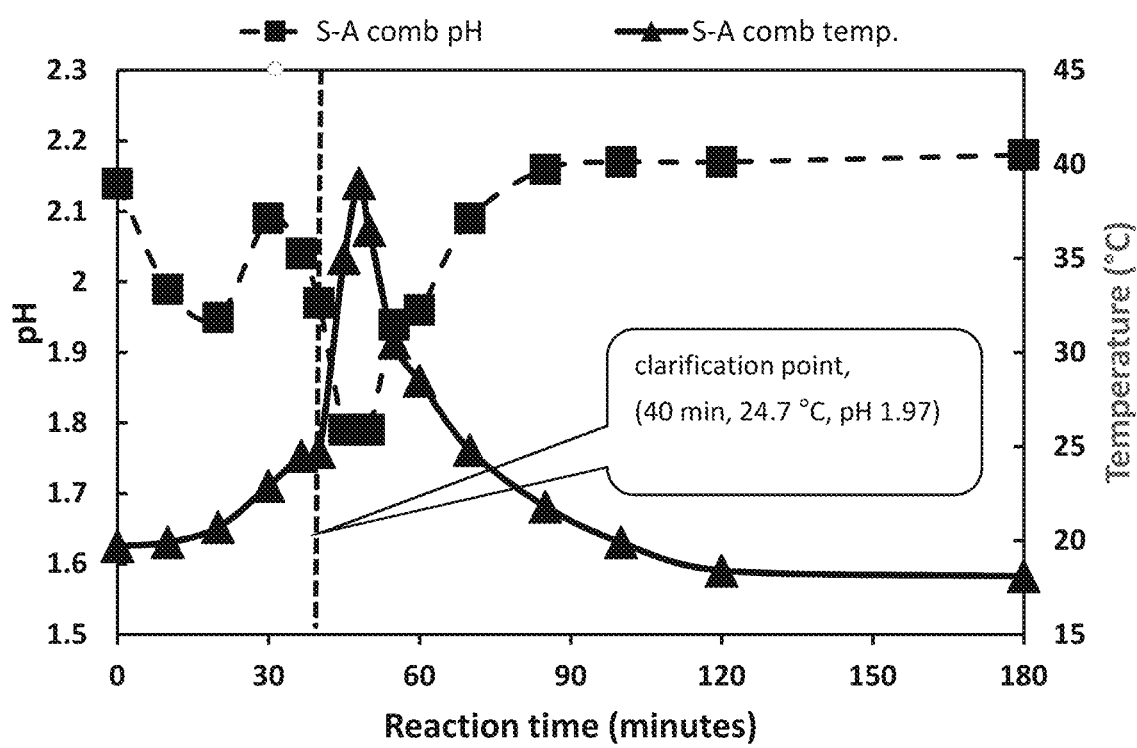
FIG. 4 illustrates the pH and temperature profile of the hydrolysis reaction of TEOS by the direct contact method (DCM) when sulfuric acid and acetic acid catalyzed the hydrolysis. The molar ratio of TEOS:water:nitric acid:acetic acid is $1:4.83:1.2\times10^{-3}:3.5\times10^{-2}$ respectively.

There is a dynamic change in temperature and pH of the solution when the silica alkoxide-water solution is catalyzed for homogenous hydrolysis by the DCM as discussed previously. FIG. 3 and FIG. 4 illustrate how the hydrolysis proceeds in the DCM by profiling pH and temperature for the first three hours for the nitric acid-acetic acid combination and the sulfuric acid-acetic acid combination, respectively In the case of the combination nitric acid-acetic acid (FIG. 3), the initial pH is about 2.2 and it decreases to a little below 2.1, but then returns back to 2.15 with a gradual increase in temperature of approximately 5° C. from room temperature over the first 30 minutes. After this period, the pH rapidly decreases once again to below 2 until the homogeneous hydrolysis starts and the solution is clarified immediately (clarification point). There is a continued decrease in pH after the homogeneous hydrolysis starts (at 50 min.) to 1.79 at 55 minutes, then an increase back to a level similar to when the reaction started (2.12) over a 30 minutes period. Such a dramatic drop in pH is caused by active oxidization of the combined two catalysts as nitric acid plays the role of the oxidizing agent and acetic acid becomes a target of this reaction as an organic species. This oxidization can occur violently when the acids react with each other at full concentration. In the DCM, however, the TEOS-water mixture provides a diluted environment and the reaction is appropriately controlled, enabling it to take place gradually.

The pre-hydrolyzed sol gradually increases in pH for another 90 minutes or so to 2.19, which is virtually equal to the initial pH of 2.2. The pH shows continuous increase very slowly for the next 2800 minutes and reaches 2.41, higher than the initial value, through further observation.

Since the DCM can proceed at room temperature, the temperature change results solely from the enthalpy change of the reaction itself. It was observed that there was a temperature spike of 38° C. (311 K) from the room temperature condition (~20° C. (293K)) 5 minutes after the solution showed immediate clarification, which indicates an active exothermic reaction due to the homogeneous hydrolysis. The temperature spike lasts for less than a minute in this process and it can be prolonged when the reaction proceeds at a large scale. Before and after the temperature spike there is a gradual rise and drop of temperature due to the initiation of the homogeneous hydrolysis and stabilization of the reaction system as it reaches completion of hydrolysis. The temperature of the pre-hydrolyzed sol returns to the ambient temperature completely 100 minutes after the start of the reaction.

When sulfuric acid was employed instead of nitric acid, another observation was made as shown in FIG. 4. The overall profiles of the pH and the temperature changes were recorded similarly with those of the nitric acid-acetic acid combination. The initial pH was 0.06 lower (2.14) and the clarification occurred 10 minutes earlier (at 40 minutes) when compared to the nitric acid-acetic acid process. Otherwise, the decreasing trend in pH and temperature after the homogeneous hydrolysis was kicked off, the stabilization time in pH and temperature (at approximately 120 minutes), and the pot life time (approximately 150 hours), showed similarity with those of the nitric acid-acetic acid combination.

Although these two combinations using the DCM appear similar in terms of changes in key properties, the reaction mechanisms are clearly different as the reaction was driven by differing combinations of catalytic compositions. While the nitric acid-acetic acid combination catalyzes the reaction by oxidization as stated earlier, the sulfuric acid-acetic acid combination is functions as a "superacids" combination. Acetic acid and sulfuric acid are, respectively, an organic carboxylic acid and an inorganic or "mineral" acid. Oxygen atoms within the carboxyl group (—COOH), though drawn adjacently, are not bound to each other. Actually, one oxygen atom is bonded only to the carbon atom, forming a carbonyl group (—C═O), while the other oxygen is bonded only to the carbon and hydrogen atoms, —C—OH. Knowing this, the reaction between the two acids can be described as, $$CH_3COOH + H_2SO_4 \rightarrow CH_3C(OH)_2^+ + HSO_4^-$$

After this reaction, a second molecule of acetic acid is protonated by the remaining bisulfate anion, $$CH_3COOH + HSO_4^- \rightarrow CH_3CO(OH)_2 + SO_4^{-2}$$

These two reactions occur simultaneously. After the first reaction is triggered, superacids result with sufficiently low pH to drive homogeneous hydrolysis. This reaction, similar to the case of the nitric acid-acetic acid combination, is controlled moderately as the two catalysts are diluted in the TEOS-water mixture.

Benefits of the DCM

The direct-contact method, DCM, that replaces the conventional pre-hydrolysis step in the two-step sol-gel process, allows one to hydrolyze a metal alkoxide (such as silicon alkoxide) homogeneously without a diluent and an excessive amount of water, thus producing a clear and pre-hydrolyzed sol. This sol is ready for a further gelation step within a few hours at ambient temperature. The DCM also yields a sol with higher concentration of silica than that obtained from the conventional method, extending the potential density range of the final gel product. Such advantages increase the flexibility of the entire sol-gel process with regards to combining with any existing material process.

The produced sols also have compatible pot life spans, which enable a variety of different types of gel products to be produced from one-time preparation of pre-hydrolyzed active sol, if desired. Finally, the production costs can be remarkably reduced as the time and energy consumed by the DCM is much less compared to the conventional two-step process. With these advantages, DCM still produces a pre-hydrolyzed sol that has properties compatible to a functional silane such as Dynasilan® SILBOND®, which is commercially available at a much higher price than TEOS. Table 2 summarizes notable differences between conventional pre-hydrolysis and the DCM.

TABLE 2

List of characteristic differences between the conventional method and DCM for pre-hydrolysis in silica sol-gel route.

| | Conventional Pre-hydrolysis | Direct Contact Method (DCM) |
|---|---|---|
| input materials | precursor, mother liquor, water, catalyst | precursor, water, catalyst |
| hydrolysis completion | in 1.5-2 hours at 60-65° C. | in 2-3 hours at ambient temperature |
| Silica content in pre-hydrolyzed sol | 8.6 wt. % or under | 20.3 wt % or over |
| gelation condition | diluted and catalyzed with heat | diluted and catalyzed |
| gelation time | hours to days at elevated temperature | seconds to hours at ambient temperature |
| pot life time of hydrolyzed sol | up to months (refrigerator storage needed) | up to a week |

Example 2. Synthesis and Evaluation of Silica Aerogels

A series of monolithic silica aerogels were fabricated via a two-step sol-gel process that employees the DCM (direct contact method), aging or rinsing, and the COLD method of $CO_2$ supercritical drying. In this example, the nitric acid-acetic acid combination in the DCM was selected as a standard process whose products are characterized and compared to: those produced from different catalytic combinations; those produced with and without the aging step required for hydrophobicity; and those produced with a range of gelation conditions, all with a focus on producing a range of porosities for the ultimate objective of enabling control of thermal conductivity via porosity.

Experimental Methods

Figure 5:
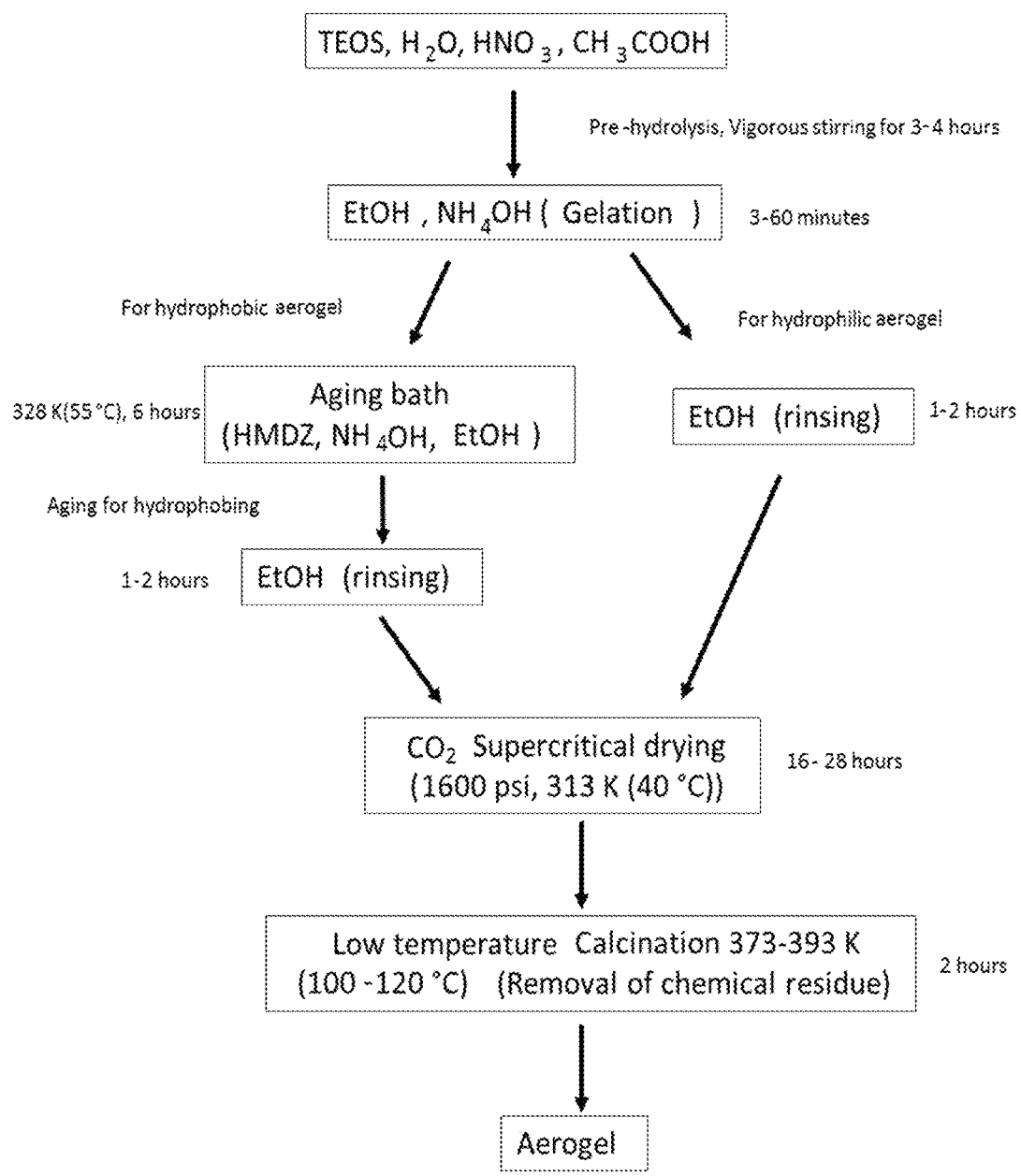
FIG. 5 illustrates an example procedure for production of silica aerogel including the DCM process in the sol-gel process (N-A comb.). Also illustrated is an optional route for the production of hydrophobic samples.

FIG. 5 shows the entire production route used for synthesis of monolithic silica aerogel in this example. This is the standard procedure and includes a number of variables to be tested: the catalysts, the aging, and the gelation conditions, all with the goal of observing the change in porosity of the resulting aerogel.

Sol-Gel Synthesis.

Aerogels were prepared using TEOS (tetraethyl orthosilicate) as the precursor. TEOS was pre-hydrolyzed by the DCM using nitric acid and acetic acid (N-A combination) for the standard samples. Sulfuric acid replaces the nitric acid (S-A combination) as the catalyst for a second series of samples. The relative molar ratios of TEOS:water:nitric acid for N-A combination (or sulfuric acid for S-A combination):acetic acid were $1.0:4.8:1.0\times10^{-3}$ ($1.2\times10^{-3}$):$3.5\times10^{-2}$. The pre-hydrolyzed sol produced from these molar ratios had 20.3 wt % of silica content which is the basis for controlling the target density of the produced gel.

After allowing the hydrolysis reaction to proceed for 3-4 hours, a calculated amount of pre-hydrolyzed sol was added to an ethanol solution, methanol solution, methanol-ethanol mixture, or ethanol-water mixture with $1.5\times10^{-3}$ vol % ammonia as a gelation catalyst. This base-catalyzed sol was vigorously stirred and transferred to a disk-shaped mold with an inner diameter of 30 mm. The sol then gelled in the mold within 18~140 minutes according to the pre-designed target densities and the structure continued to strengthen for the next 45 to 50 minutes before initiating the aging step.

Aging—Post Sol-Gel Treatment.

The wet gel was then optionally aged in an aging solution prepared by HMDS (1,1,1,3,3,3-hexamethyldisilazine) diluted in ethanol at 328 K (55° C.) for 6 hours. This step imparts the hydrophobic behavior on the gel as the methyl groups are attached to the silica chains. A hydrophilic aerogel was prepared by skipping this aging step and directly drying under supercritical conditions. Table 3 lists the chemical reagents used for this aerogel process along with selected reagent properties.

TABLE 3

List of reagents used for the silica aerogel production process.

| Reagent | Formula | Mol. wt. | Density (g/cm³) | Boiling Point (° C.) | Supplier |
|---|---|---|---|---|---|
| TEOS | $Si(OC_2H_5)_4$ | 208.33 | 0.934 | 166 | Aldrich |
| Ethanol | $C_2H_5OH$ | 46.07 | 0.79 | 78.1 | McMaster |
| Methanol | $CH_3OH$ | 32.04 | 0.79 | 64.7 | Aldrich |
| Ammonia solution | $NH_4OH$ | 40.00 | 0.504 | 36.0 | Cole-Palmer |
| Nitric acid | $HNO_3$ | 63.01 | 1.51 | 83.0 | Fisher |
| Sulfuric acid | $H_2SO_4$ | 98.08 | 1.84 | 337 | Fisher |
| Acetic acid | $C_2H_4O_2$ | 60.05 | 1.049 | 40 (flash point) | J. T. Baker |
| HMDS | $C_{16}H_{19}NSi_2$ | 161.40 | 0.760 | 20.0 (flash point) | Acros |

Supercritical Drying Process and Low Temperature Calcination.

Figure 6:
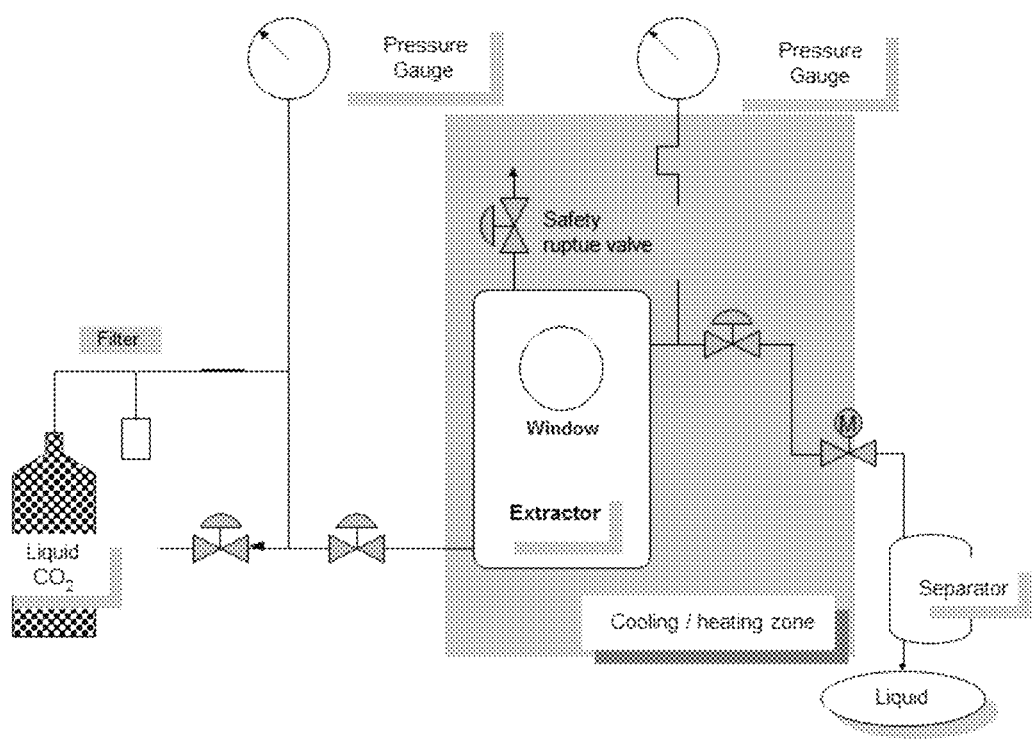
FIG. 6 is a schematic diagram illustrating the supercritical drying unit used for the COLD method.

The aged wet gel was then rinsed by soaking in successive baths of pure ethanol multiple times to wash away any possible unreacted chemicals, and then finally transformed from a wet gel into an aerogel via the low temperature supercritical drying process in a supercritical extractor unit built as shown in FIG. 6 (the COLD method). A Polaron critical point dryer (E3100, Polaron) was used as an extractor and an Isotemp 1016D (Fisher Scientific) was used to control the temperature of the extractor conductively.

Figure 7:
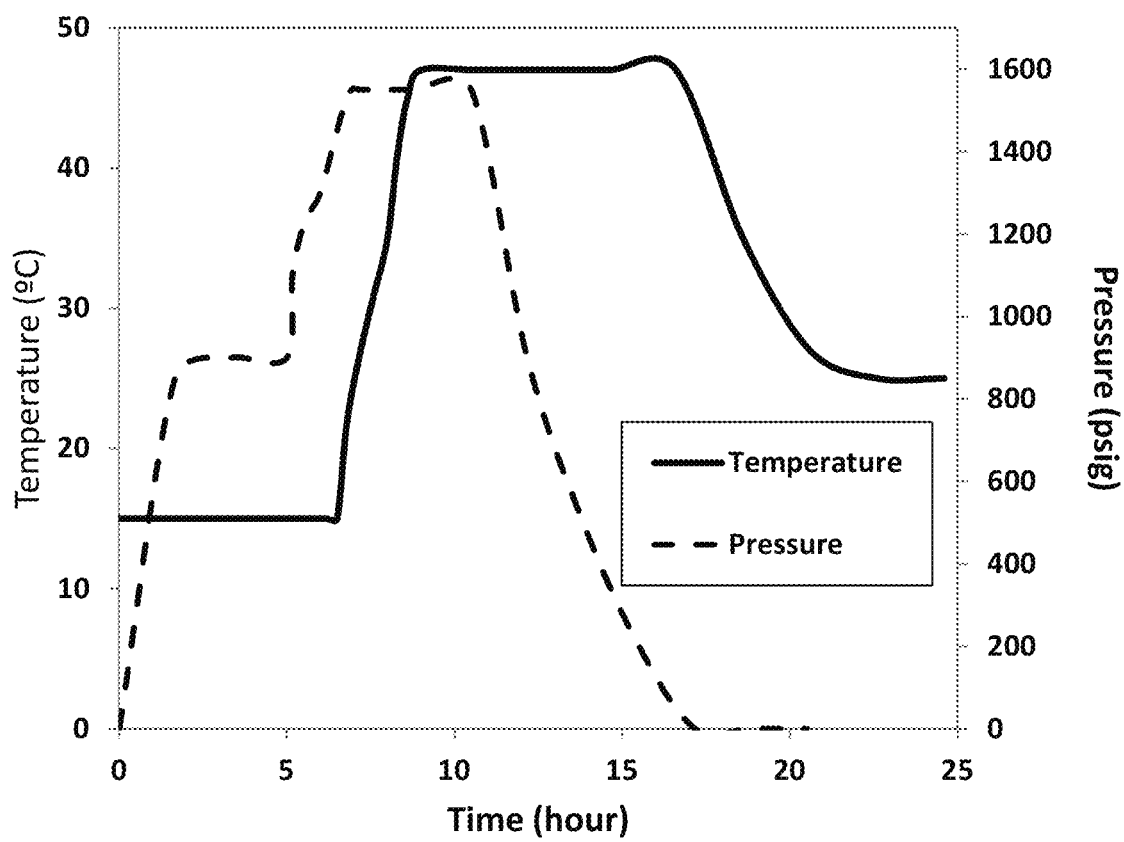
FIG. 7 is a plot showing the temperature and pressure profiles of the $CO_2$ supercritical drying process (the COLD method).

During the supercritical drying process, solvent exchange occurred and the ethanol liquid was replaced with liquid carbon dioxide at 850 psig and 288 K (15° C.). When the fluid exchange step was completed, the drying system was heated to 313 K (40° C.) and the pressure increased to 1600 psig, transforming the liquid $CO_2$ inside the autoclave to a supercritical fluid. FIG. 7 shows the temperature-pressure changes while the $CO_2$ changes from a liquid to the supercritical phase, and back to the gaseous phase for the depressurization process. Once the supercritical $CO_2$ is vented from the autoclave, the air-filled silica aerogel remains. When unloaded from the autoclave this as-dried aerogel has chemical residue due to the byproducts of the sol-gel reaction and excessive water molecules. These impurities can be removed by low temperature calcination. The aerogel was then calcinated at 373~393 K (100~120° C.) at a heating rate of 2° C./min for 2 hours in a convection oven. The low temperature calcination enabled evaporation of any residual chemicals while the inherent structure of the aerogel remained intact.

Characterization

Structural properties of the produced aerogels were characterized by nitrogen adsorption-desorption with the porosity estimated by measuring the apparent density and skeletal density. Brunauer-Emmett-Teller (BET) surface areas, pore volumes, and pore size distributions were measured by nitrogen adsorption-desorption at 77 K (−196° C.) using a Micromeritics ASAP 2010 instrument. The mesopore size distributions were calculated applying the Barrett-Joyner-Halenda method (BJH) to the desorption branch of the isotherm. Prior to the measurement, all samples were outgassed at 383 K (110° C.) for 12 hours. In addition, scanning electron microscopy (SEM) and morphological comparison were selectively used for further understanding of the textural properties of the aerogel related to the porosity.

The skeletal densities of the produced aerogels were measured using a helium pycnometer, an AccuPyc II 1340 (Micromeritics). This is a fully automated gas displacement pycnometer which determines skeletal density and volume by measuring the pressure change of helium within a calibrated volume. Once the sample is loaded, the pycnometer runs ten cycles of helium gas charging and discharging gas steps, and averages the results from these multiple runs in order to increase the accuracy of the measured value. The device has an uncertainty of 0.06% and reproducibility guaranteed to within 0.02% according to equipment specifications.

The bulk density (apparent density) of aerogel is simply the ratio of mass to volume of the monolithic sample. Mass was measured with a scale with an accuracy of ±0.04 mg and the dimensions of the aerogel were measured with an accuracy of ±0.0005 mm. Thus, the overall uncertainty in the apparent (bulk) density is ±0.00019 $g/cm^3$.

Sample Preparations

To enable exploration of the effects of various processing parameters on the resulting porosity and texture of the aerogel, a variety of production modifications were explored as summarized below.

Variations in Target Density and Porosity of "Standard Samples" Via Gelation Time.

As previously described the "standard" processing condition explored in this example use TEOS (tetraethyl orthosilicate) as the precursor, pre-hydrolyzed using nitric acid and acetic acid (N-A comb), in the DCM process. Nine standard samples were thus prepared, adjusting the target density from 0.0194 to 0.1358 $g/cm^3$ in intervals of approximately 0.01-0.02 $g/cm^3$. The target density was controlled by considering the silica content (20.3 wt %, see above) in the whole volume of the gel that includes the pre-hydrolyzed sol and the solvent. After estimating the amount of silica solid for a specific target density, the quantified amount of pre-hydrolyzed sol that had the corresponding amount of silica solid was utilized in the gelation process. In the gelation, this sol was mixed with the solvent that had also been quantified and mixed with the gelation catalyst, so the total volume of the pre-hydrolyzed sol and the solvent satisfied the volumetric condition of the planned target density. The gelation catalyst was only 0.15 vol % so it was neglected in the target density calculation. These nine samples were used for a basic investigation of porosity and structural properties.

An additional three samples were also prepared by locating additional target densities in the middle-low, the middle, and the high values of the range studied (0.0194-0.1358 $g/cm^3$). These three samples were expected to allow a more detailed examination of the relationship between target density and gelation time in "standard samples". Thus, a total of twelve standard samples were used to compare the influence of target density on gelation time as the gelation time is one of the most important processing conditions in the production environment. The specifics of these twelve standard samples along with their Sample ID are given in Table 4 with the quantified amount of pre-hydrolyzed sol, the amount of solvent, and the target density.

TABLE 4

List of samples of monolithic silica aerogels and their processing conditions prepared by the standard process (the nitric acid - acetic acid combination for the DCM catalyst). The three additional samples prepared for the gelation time investigation were 2.0/8.0, 3.5/6.5, and 7.0/3.0.

| Sample ID | pre-hydrolyzed sol (ml) | diluent (ethanol) (ml) | target density (g/cm³) |
|---|---|---|---|
| 1.0/9.0 | 1.0 | 9.0 | 0.0194 |
| 1.5/8.5 | 1.5 | 8.5 | 0.0291 |
| 2.0/8.0 | 2.0 | 8.0 | 0.0388 |
| 2.5/7.5 | 2.5 | 7.5 | 0.0485 |
| 3.0/7.0 | 3.0 | 7.0 | 0.0582 |
| 3.5/6.5 | 3.5 | 6.5 | 0.0679 |
| 4.0/6.0 | 4.0 | 6.0 | 0.0776 |
| 4.5/5.5 | 4.5 | 5.5 | 0.0873 |
| 5.0/5.0 | 5.0 | 5.0 | 0.0970 |
| 6.0/4.0 | 6.0 | 4.0 | 0.1164 |
| 6.6/3.4 | 6.6 | 3.4 | 0.1213 |
| 7.0/3.0 | 7.0 | 3.0 | 0.1358 |

Variations in Solvent Types of "Standard Samples" Via Changing Gelation Time.

In order to evaluate the effects of solvent type on porosity and aerogel structure, the solvent type was changed in three ways. First, the ethanol, which is the solvent of the standard process, was replaced with methanol to observe how the nature of the solvent affects porosity and the formation of the aerogel structure. Second, a methanol-ethanol mixture was used as the solvent.

TABLE 5

List of samples of monolithic silica aerogels prepared by different solvent type. All samples were produced at the target density of 0.0582 g/cm³ so 3.0 mL of the pre-hydrolyzed sol produced by the standard DCM was used to prepare each samples.

| Sample ID | Solvent (diluent) Type |
|---|---|
| 3.0/7.0 | 7.0 ml ethanol |
| 3.0/7.0M | 7.0 ml methanol |
| 3.0/7.0ME | 3.5 ml ethanol and 3.5 ml methanol |
| 6Et/1W | 6.0 ml ethanol and 1.0 ml (14 vol %) water |
| 5Et/2W | 5.0 ml ethanol and 2.0 ml (28 vol %) water |

These two alcohols were mixed at equal volumetric ratio (50 vol %) and added to the pre-hydrolyzed sol as the solvent during gelation. In the standard process, ethanol was selected because it is a mother liquor of TEOS after the sol-gel reaction is complete. Use of mother liquor as a solvent prevents trans esterification, which is a reverse reaction of the hydrolysis in the sol-gel process. On the other hand, non-mother liquor can be employed to intentionally reduce the hydrolysis rate. The slow hydrolysis rate retards the subsequent poly condensation rate of the gelation. This slow gelation enables formation of highly uniform pore sizes by slow crosslinking of the silica chains. The result from use of the mixed solvent was expected to show how porosity and gel structure are affected by the co-existence of the mother liquor and non-mother liquor as gelation occurs. Third, different ethanol-water mixtures were tested as the solvent. Ethanol was diluted with water at two different concentrations of 14 and 28 vol % respectively, so the impact of the existence of the water in the solvent on the porosity and the gel structure could be explored. Table 5 lists the details on the samples used to investigate the influence of differences in the solvent type applied for this study.

Variations in the Catalytic Combination in the DCM.

As illustrated in Table 6, the effects of the catalytic combination in the DCM were also studied by using sulfuric acid-acetic acid combination. Nine samples were produced with target densities in the same range as the standard samples produced (0.0194 to 0.1358 g/cm³) above. Gelation times were recorded for processes utilizing the same amount of the gelation catalyst as used for the standard samples and the times were compared. One of the nine samples was also selected and characterized to observe differences in the BET surface area, pore size distribution, and porosity from those of the standard sample produced with the same target density as this selected one.

TABLE 6

List of samples of monolithic silica aerogels and their processing conditions produced by different catalytic combination of sulfuric acid - acetic acid for the DCM.

| Sample ID | Pre-Hydrolyzed Sol (mL) | Diluent (ethanol) (mL) | Target Density (g/cm³) |
|---|---|---|---|
| SA1.0/9.0 | 1.0 | 9.0 | 0.0194 |
| SA1.5/8.5 | 1.5 | 8.5 | 0.0291 |
| SA2.0/8.0 | 2.0 | 8.0 | 0.0388 |
| SA2.5/7.5 | 2.5 | 7.5 | 0.0485 |
| SA3.0/7.0 | 3.0 | 7.0 | 0.0582 |
| SA4.0/6.0 | 4.0 | 6.0 | 0.0776 |

TABLE 6-continued

List of samples of monolithic silica aerogels and their processing conditions produced by different catalytic combination of sulfuric acid - acetic acid for the DCM.

| Sample ID | Pre-Hydrolyzed Sol (mL) | Diluent (ethanol) (mL) | Target Density (g/cm³) |
|---|---|---|---|
| SA5.0/5.0 | 5.0 | 5.0 | 0.0970 |
| SA6.0/4.0 | 6.0 | 4.0 | 0.1164 |
| SA7.0/3.0 | 7.0 | 3.0 | 0.1358 |

Variations in Aging Process.

Finally, variation of the aging process was investigated. As the standard process produces hydrophilic silica aerogel, the aging process was changed into a post sol-gel process in order to produce hydrophobic aerogel. During this post processing step, alkyl groups are attached to the silica chains that create hydrophobicity. This chemical change affected the structural properties of the resulting aerogel, including porosity and pore size distribution, so three hydrophobic silica aerogels were repeatedly produced at a specific target density and gelation time, apparent density, and porosities were averaged to compare to those of the standard sample produced at the same target density. The BET surface area and pore size distribution were obtained from one of the three samples and also compared to those of the standard sample. Table 7 lists the samples produced by different aging processes.

TABLE 7

List of samples of hydrophilic and hydrophobic monolithic silica aerogels and their aging process. Samples were produced with a target density of 0.0582 g/cm³ so 3.0 ml of the pre-hydrolyzed sol produced by the standard DCM was used to prepare each sample.

| Sample ID | Sample Property (Target Density: 0.0582 g/cm³) | Aging Process |
|---|---|---|
| 3.0/7.0 | Hydrophilic aerogel | Rinsed in ethanol for 1-2 hours |
| HB3.0/7.0 | Hydrophobic aerogel | Aged in HMDZ (1,1,1,3,3,3-hexamethyldisilazine) for 6 hours at 55° C. followed by ethanol rinse for 1-2 hours |

Results and Discussion

Effects of Target Density on Gelation Time of Monolithic Silica Aerogel.

Gelation time in the two-step sol-gel synthesis is affected by the synthetic conditions which include silica content, amount and type of catalyst, aging of the pre-hydrolyzed sol, and nature of the diluent. Having all other parameters unchanged, different target densities were applied for each sample and gelation was observed by the tilt method. The "tilt method" is a simple technique used to confirm the completion of gelation. The disk mold containing the sol-to-gel solution is tilted and observed to ensure there is no movement of the solution.

Figure 8:
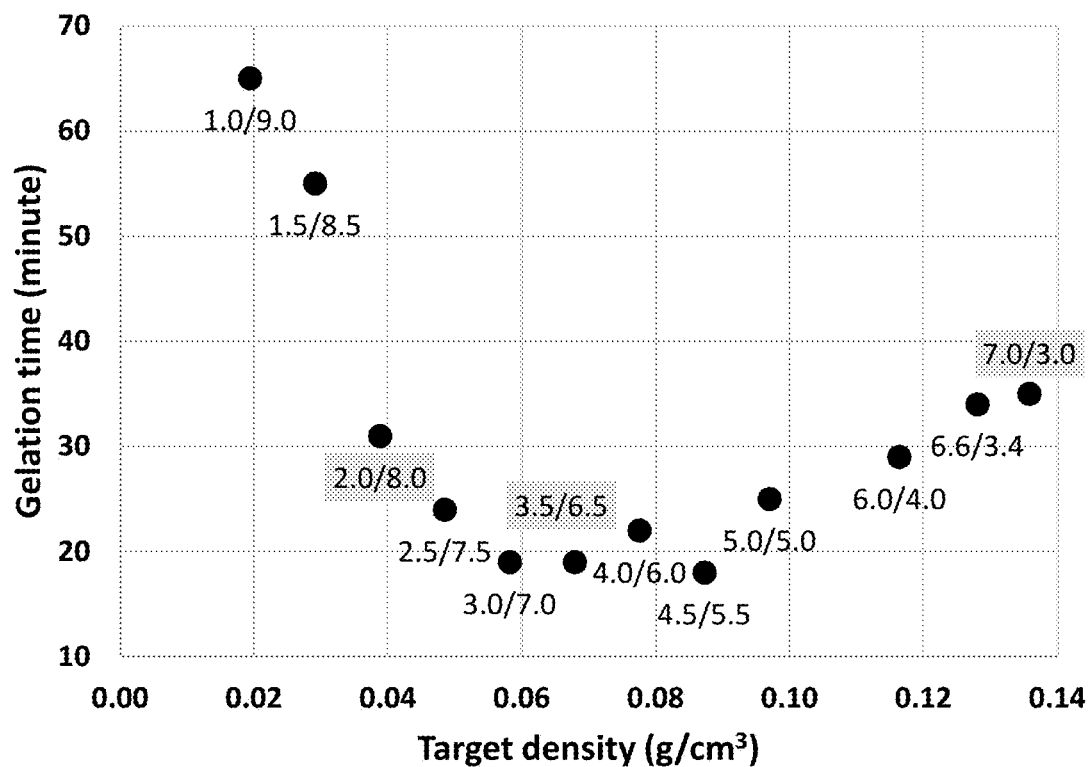
FIG. 8 is a plot illustrating the effects of target density on gelation time for the monolithic silica aerogel produced by nitric acid-acetic acid combination for the DCM during sol-gel synthesis (standard process). The three additional samples for the gelation time investigation are 2.0/8.0, 3.5/6.5, and 7.0/3.0 (highlighted). The uncertainties are ±5% and ±2% in target density and gelation time, respectively.

When the nitric acid-acetic acid combination was used in the DCM (the standard process), the gelation time decreased as the target density increased up to near 0.0582 g/cm³ (3.0/7.0), and it stayed at nearly this same level until the target density became approximately 0.0970 g/cm³ (5.0/5.0). The gelation took considerably longer when the target density was larger than 0.0970 g/cm³ as shown in FIG. 8. Such change of pattern in the gelation time occurs because the increasing silanol groups that must be catalyzed for poly condensation slow down the overall gelation reaction as the target density increases.

Figure 9:
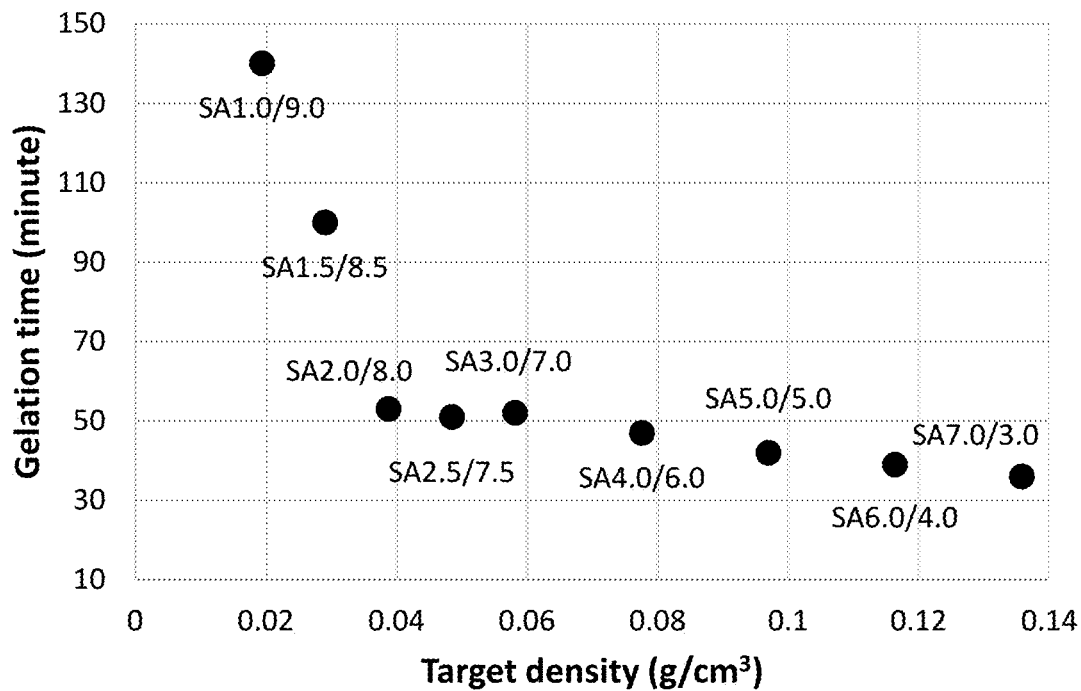
FIG. 9 is a plot illustrating the effects of target density on gelation time for the monolithic silica aerogel produced by sulfuric acid-acetic acid combination for the DCM during the sol-gel synthesis. The uncertainties are ±5% and ±2% in target density and gelation time respectively.

FIG. 9 shows the gelation time pattern as the target densities were changed when the sulfuric acid-acetic acid combination was employed in the DCM. Notably different than the standard process, the gelation time was steadily and slowly reduced after a sharp drop between 0.0194 g/cm$^3$ (SA1.0/9.0) and 0.0388 g/cm$^3$ (SA2.0/8.0) as the target density was increased up to 0.1358 g/cm$^3$ (SA7.0/3.0). The overall gelation times were greater compared to those of the standard samples, which were produced from the DCM with the nitric acid-acetic acid combination.

Effects of Solvent Types on Gelation Time of Monolithic Silica Aerogel.

Table 8 shows the gelation times observed for the various solvent types investigated in the production of monolithic silica aerogel. Based on the processing condition for the standard sample with a target density of 0.0582 g/cm$^3$, it is observed that the gelation time increases when water or methanol are used partially and wholly as diluents. This result suggests that the poly condensation is affected when different solvents from the mother liquor of the precursor (it is ethanol for TEOS) or any additives (water in this research) are mixed even with the mother liquor as a diluent because it hinders the silanol groups from chaining with each other to form a silica network by occupying the space where the condensation occurs continuously. Consequently, the gelation is retarded and the time taken for the formed silica networks to be strengthened increases as observed in the gelation time changes.

TABLE 8

Effects of solvent types on gelation time of monolithic silica aerogel.

| | Sample ID | | | | |
|---|---|---|---|---|---|
| | 3.0/7.0 | 3.0/7.0M | 3.0/7.0ME | 6Et/1W | 5Et/2W |
| Diluent Composition | EtOH | MeOH | EtOH/MeOH (50%/50%) | EtOH/H$_2$O (86%/14%) | EtOH/H$_2$O (72%/28%) |
| Gelation Time (minutes) (Uncertainty: ±5%) | 19 | 82 | 53 | 58 | 93 |

Effects of Apparent Density on Transparency of Monolithic Silica Aerogel.

Figure 10:
FIG. 10 is a photograph illustrating the transparency of monolithic silica aerogels based on the apparent density (prepared by the standard process). The apparent densities of each aerogel from the left are 0.0529, 0.1244, 0.1285, 0.1733, and 0.2188 $g/cm^3$, respectively. The sample IDs from the left are 1.5/8.5, 2.5/7.5, 3.0/7.0, 4.0/6.0, and 5.0/5.0.

The produced silica aerogel monoliths have good transparency over some target density range, indicating their suitability for insulation for dual pane window systems. FIG. 10 illustrates the change in transparency of monolithic disc type silica aerogels produced using the DCM method with nitric acid-acetic acid combination with different apparent (actual, or bulk) densities. As shown in FIG. 10, the transparency is increased with higher apparent density that results from a higher target density in general. This is quite different from that expected with regard to the morphological properties, as the lower target density results in thinner silica backbones with more spaces (pores) between them which appear to scatter less light, hence the corresponding sample aerogel possesses greater transparency.

Figure 11:
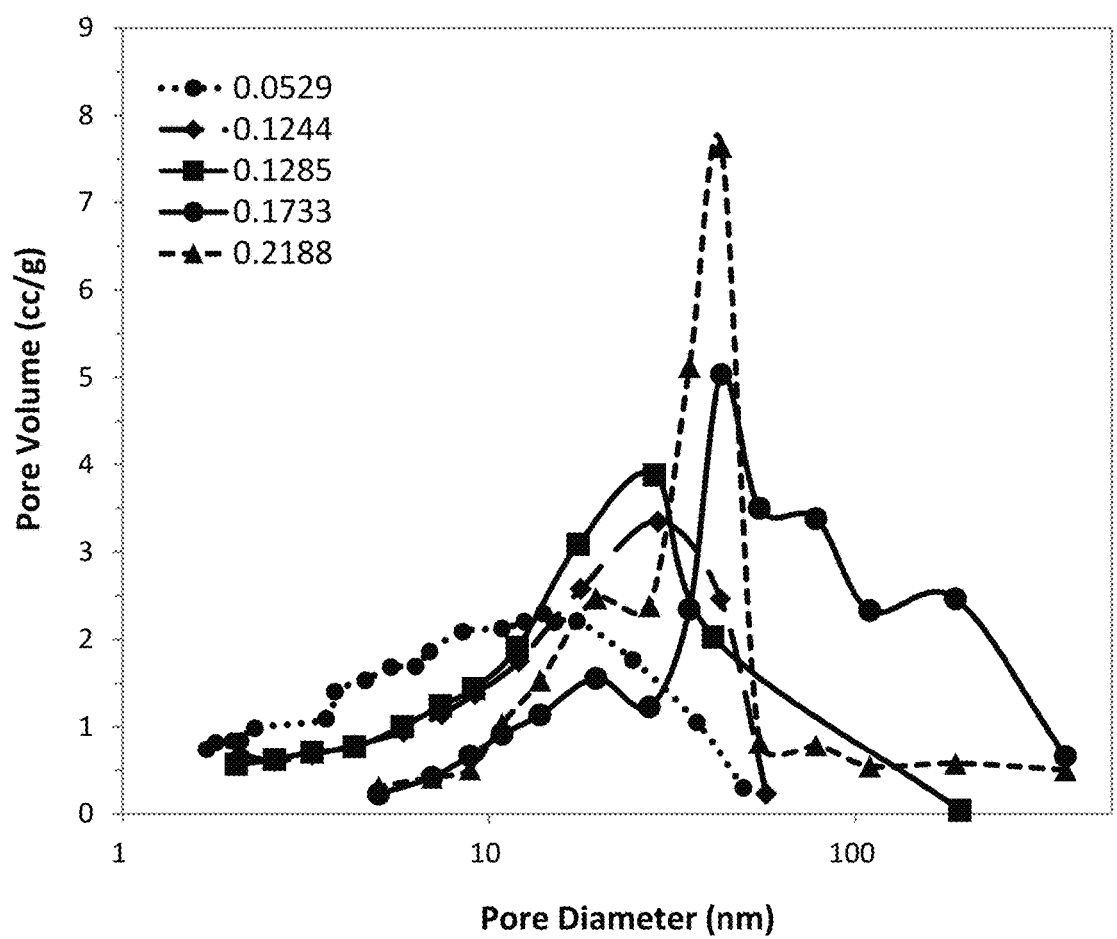
FIG. 11 is a plot illustrating the effects of apparent density ($g/cm^3$) on pore size distributions of monolithic silica aerogels prepared by the standard process (the nitric acid-acetic acid combination for the DCM). The sample IDs from the lowest apparent density are 1.5/8.5, 2.5/7.5, 3.0/7.0, 4.0/6.0, and 5.0/5.0, respectively.

However, this unexpected result was explained when the pore size distributions of the sample aerogels from the BJH method (nitrogen desorption) were compared for the different apparent densities as illustrated in FIG. 11. It was observed that a lower apparent density results from the lower target density, which causes the produced monolithic silica aerogel to have a broader range of pore size distributions. The width of the pore size distribution narrows as the apparent density is increased with higher target density. While the three-dimensional thickness of the silica backbones of the aerogel can affect the transparency of the silica aerogel as mentioned earlier, such narrower pore size distributions can also be considered as another textural property that influences the transparency of the monolith. It turns out that the latter property in this performed synthetic method influences the light-transmitting capacity over the former one as the structural parameter which results in more transparent silica aerogel. On the other hand, the thinner silica backbones of the lower density aerogels are more three-dimensionally crosslinked in texture, thus interrupting the light transmission, which results in translucent, or opaque silica aerogel.

Table 9 lists the BET surface area, pore volume, and average pore diameter of the silica aerogels analyzed and discussed above with the range of target densities. An increase in the pore volume was observed with increasing target density while the surface areas show unclear differences but remain around 1000 m$^2$/g, with the exception of the one with the highest target density (0.097 g/cm$^3$), which has a surface area above 1100 m$^2$/g. The average pore diameters in this studied range showed increases (from 7.49 nm to 12.24 nm) with increased target density from 0.029 g/cm$^3$ up to 0.077 g/cm$^3$, but then a decrease to 10.94 nm at the highest target density, 0.097 g/cm$^3$. These independent trends between the textural properties discussed show that the silica aerogel production process can be adjusted to optimize a selected property among them, including the porosity of silica aerogel that will be discussed later.

TABLE 9

Effects of target density on textural properties of monolithic silica aerogels.

| Sample ID | Target Density (g/cm$^3$) | BET Surface Area (m$^2$/g) | Pore Volume (N$_2$ Desorption) (cc/g) | Average Pore Diameter (nm) |
|---|---|---|---|---|
| 1.5/8.5 | 0.0291 | 1008.3 | 2.21 | 7.49 |
| 2.5/7.5 | 0.0485 | 936.5 | 2.48 | 10.43 |
| 3.0/7.0 | 0.0582 | 955.2 | 2.63 | 10.33 |
| 4.0/6.0 | 0.0776 | 1036.8 | 3.17 | 12.24 |
| 5.0/5.0 | 0.0970 | 1169.2 | 3.17 | 10.94 |

Effects of Target Density on Apparent Density and Skeletal Density.

Figure 12:
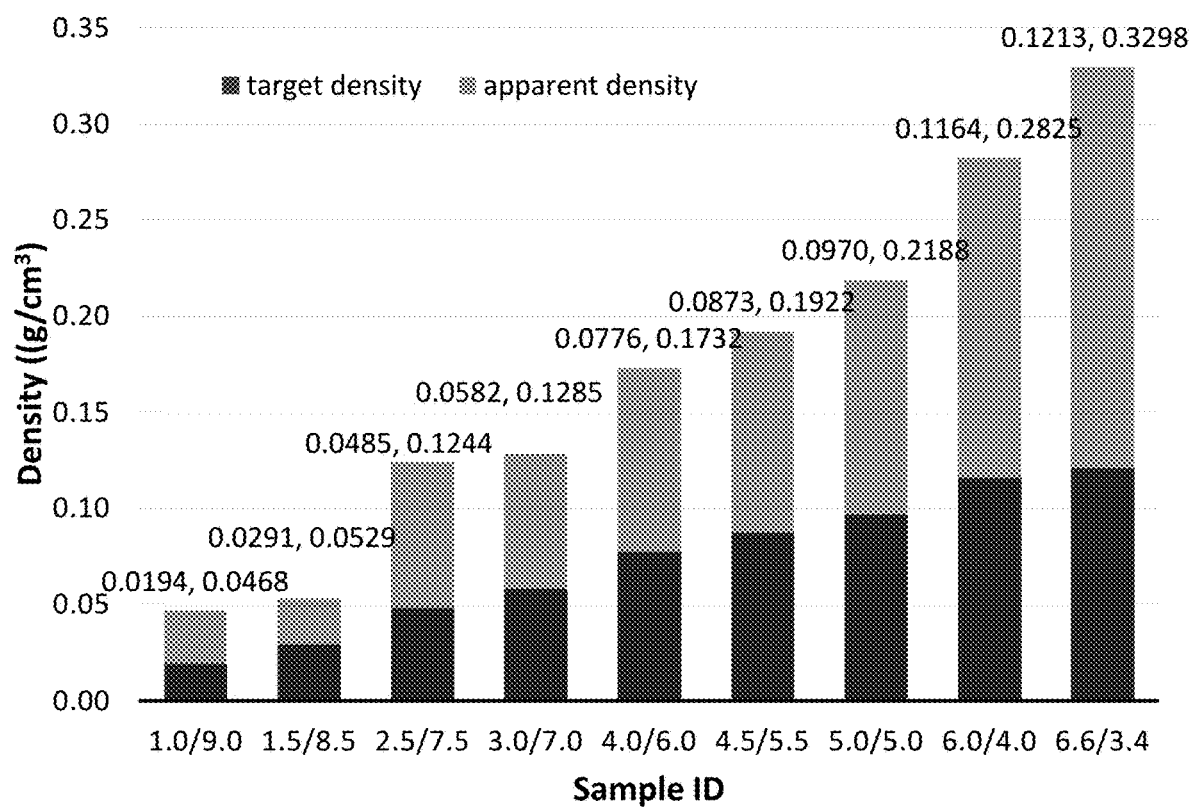
FIG. 12 is a plot illustrating the effects of target density on actual apparent density of monolithic silica aerogel prepared by the standard process (the nitric acid-acetic acid combination for the DCM). The left value of the data label is the target density ($g/cm^3$) and the right one is the apparent density ($g/cm^3$) for each sample. The uncertainties are ±5% and ±0.19% in target density and apparent density, respectively.

When silica aerogel is synthesized, the actual apparent density is higher than the target density, which is assumed to be identical to the final density in theory, mainly due to synerisis effects during the aging and rinsing period before the wet gel is supercritically dried. There is also minor collapsing of the inherent pores of the alcogel during supercritical drying due to incomplete solvent removal with liquid CO$_2$. FIG. 12 shows the differences between these two densities as the range of the target density of the produced silica aerogels increases from 0.0194 (sample ID:1.0/9.0) to 0.1213 g/cm$^3$ (sample ID:6.6/3.4). With the variation of ±0.4507 g/cm$^3$, the average ratio of the apparent density to the target density is 2.31.

Figure 13:
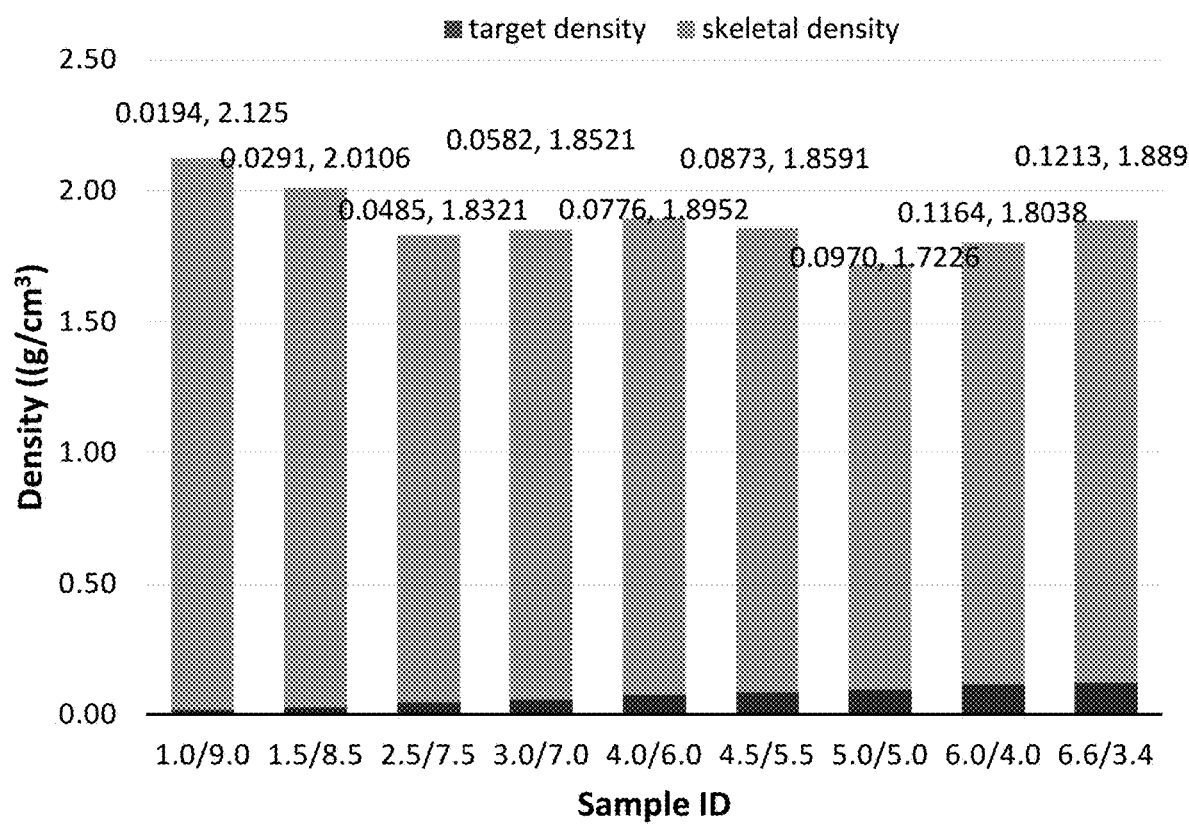
FIG. 13 is a plot illustrating the effects of target density on skeletal density of monolithic silica aerogel (standard process). The left value of the data label is the target density ($g/cm^3$) and the right one is the skeletal density ($g/cm^3$) for each sample. The uncertainties are ±5% and ±0.06% in target density and skeletal density respectively.

Interestingly, the skeletal density shows a remarkably different trend when compared to the target density as shown in FIG. 13. Generally, the skeletal density descreases with increasing target density. The highest value of skeletal density (2.2150 g/cm$^3$) was observed for a target density of 0.0194 g/cm³, which is the lowest amongst this set of samples. The lowest skeletal density (1.7226 g/cm³) was for a target density of 0.0970 g/cm³. During the formation of the silica backbone by poly condensation in the gelation step, the lower target density provides more space where the crosslinking occurs in a more multidemensional fashion compared to the synthetic condition with higher target density. This spatial environment of the reaction system also offers less opportunity for the silianol groups to be interupted by byproducts from the gelation, such as excessive water and alchol. As these two process conditions contribute to building the silica structure more than other parameters, they yield thicker growth of the braided silica network and higher skeletal density results.

Although the overall trends of the skeletal density was decreased with increasing target density, repetition of increasing and decreasing in skeletal densities were observed when they were compared side by side with change of the target density. The skeletal density were decreased over the range of target densities of 0.0194-0.0485 g/cm³, but increased again for target densities between 0.0485-0.0776 g/cm³. This pattern was repeated in futher observation of the next target density ranges, so the skeletal density was decreased in 0.0776-0.0970 g/cm³ of the target density range and it was increased in 0.0970-0.1213 g/cm³. Such repetition of trend change can be explained by considering the two processing parameters of the concentration of the gelation catalyst, that is ammonia in this example, and the amount of silanol that is associated with the target density. The gelation proceeds faster when the amount of silanol is increased and it influences the reaction rate more than the concentration of ammonia. However, the gelation occurs rather slowly when the amount of silanol is too great for the applied amount of ammonia to catalyze the poly condensation promptly. Note again that this consideration can be applied when a relatively small range of target densiy of approximately 0.03 g/cm³ is observed. At wider range, as investigated in this example, the trend in the changes in skeletal density decreased in an oscillating manner as the target density increased, as seen in FIG. 13.

Porosity Changes with Densities.

Figure 14A:
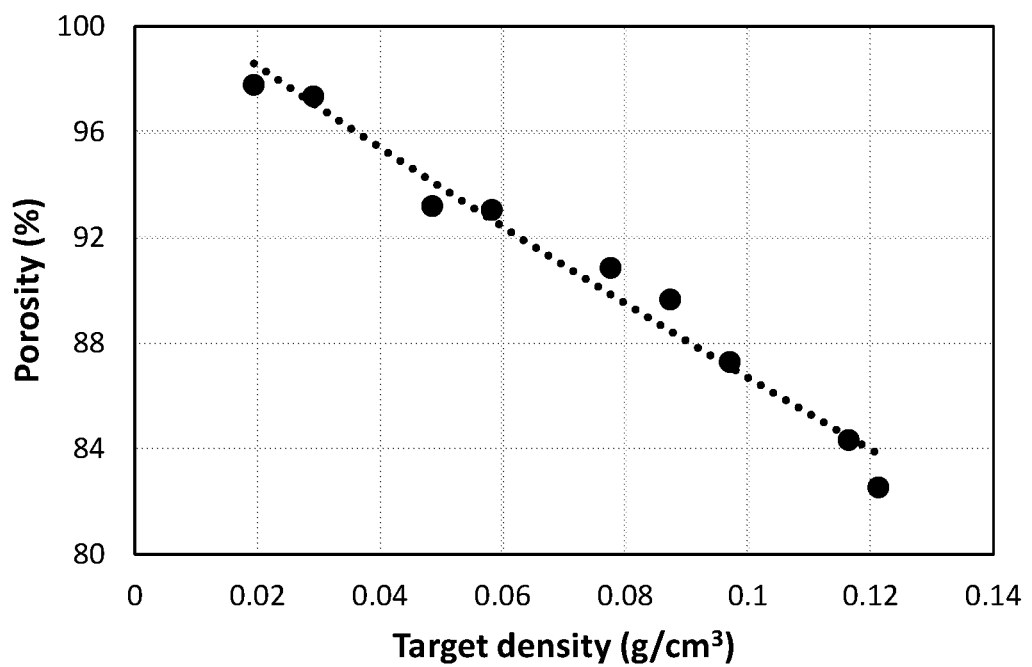
FIG. 14A and FIG. 14B illustrate the porosity distributions for different target densities (FIG. 14A) and apparent densities (FIG. 14B) of silica aerogels prepared from the standard process. The uncertainties are ±5%, ±0.19%, and ±0.25% in target density, apparent density, and gelation time respectively.
Figure 14B:
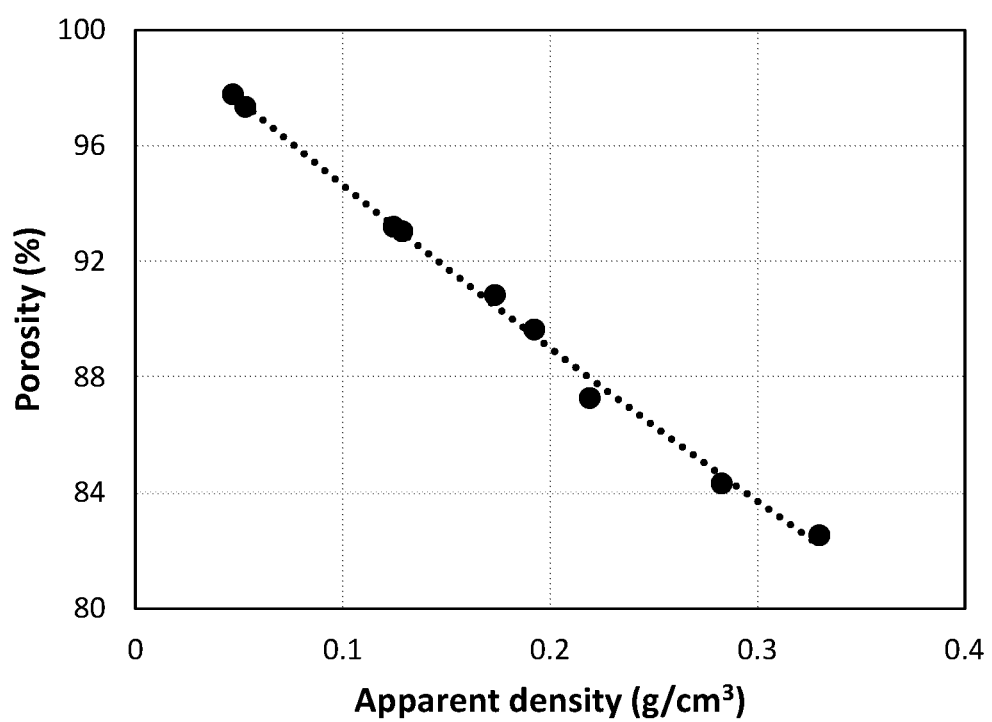

Samples ID#1.0/9.0, 1.5/8.5, 2.5/7.5, 3.0/7/0, 4.0/6.0, 4.5/5.5, 5.0/5.0, 6.0/4.0, and 6.6/3.4 were used to investigate the porosity changes with target, apparent and skeletal densities. The measured porosities of the silica aerogels produced using the standard process (the nitric acid-acetic acid combination for the DCM) are plotted with the target density and the apparent density, respectively, as shown in FIG. 14A and FIG. 14B. The target density was inversely proportional to the porosity throughout the range studied. The same held for the apparent density. That is the lower target density or apparent density aerogels were the most porous. On the other hand, Table 10 shows the porosity as it varies with skeletal density, and the trend is less clear, but it appears the porosity increases with increasing skeletal density. This implies that the relationship between porosity and the two resulting densities (skeletal density and apparent density) was dominated by that of the porosity and the apparent density in this investigated range, although the porosity was calculated using both densities. The highest and the lowest porosities are 97.798% and 82.543% when the target densities are 0.01 and 0.12 g/cm³, respectively

TABLE 10

List of skeletal density and porosity of monolithic silica aerogels produced using the standard process. The uncertainties are 0.06% and 0.25% in skeletal density and porosity respectively.

| Sample ID | Skeletal Density (g/cm³) | Porosity (%) |
| --- | --- | --- |
| 1.0/9.0 | 2.1250 | 97.798 |
| 1.5/8.5 | 2.0106 | 97.369 |
| 2.5/7.5 | 1.8321 | 93.211 |
| 3.0/7.0 | 1.8521 | 93.061 |
| 4.0/6.0 | 1.8952 | 90.860 |
| 4.5/5.5 | 1.8591 | 89.661 |
| 5.0/5.0 | 1.7226 | 87.296 |
| 6.0/4.0 | 1.8038 | 84.336 |
| 6.6/3.4 | 1.8890 | 82.543 |

Discussion of Morphological Analysis from SEM Pictures.

Figure 15A:
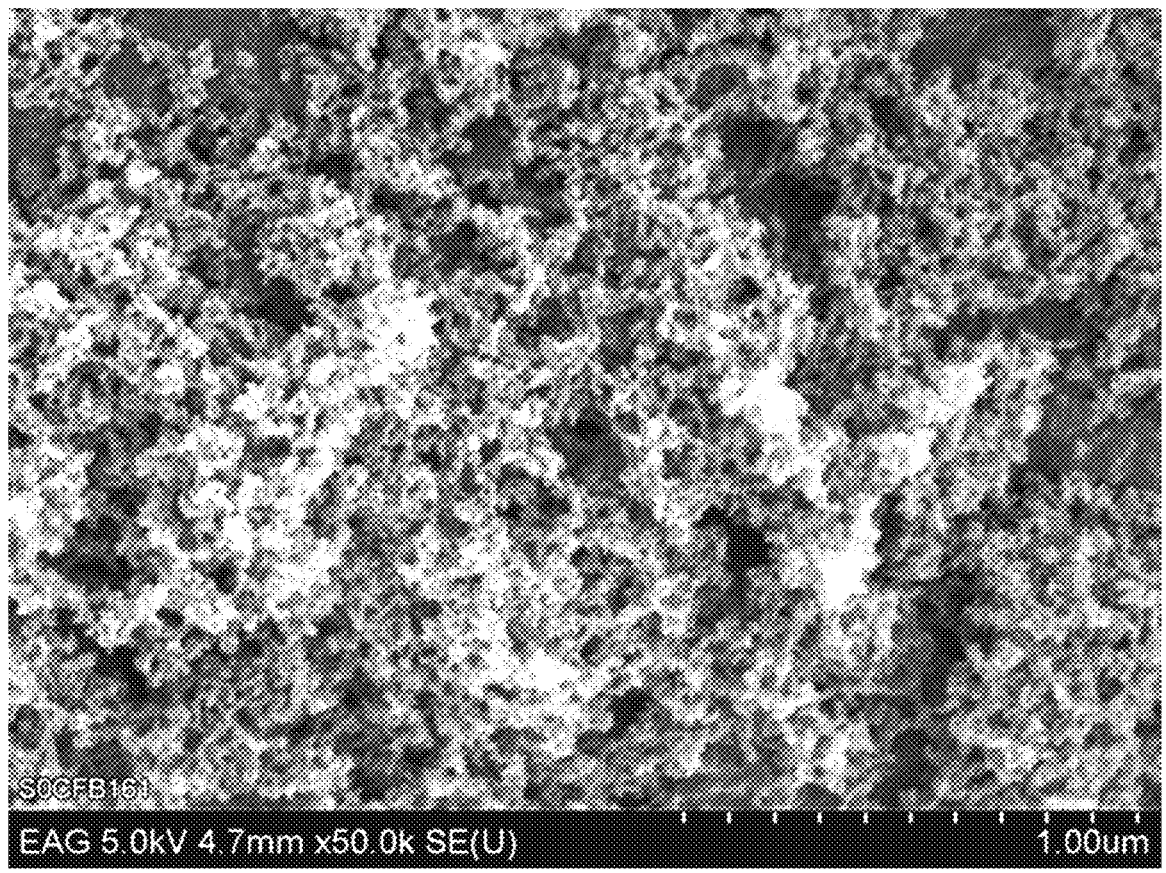
FIG. 15A and FIG. 15B show SEM photographs of 1.5/8.5, which has a low apparent density (0.0529 $g/cm^3$) and a high skeletal density (2.0106 $g/cm^3$). The monolithic silica aerogel was prepared by the standard process (magnification.
Figure 15B:
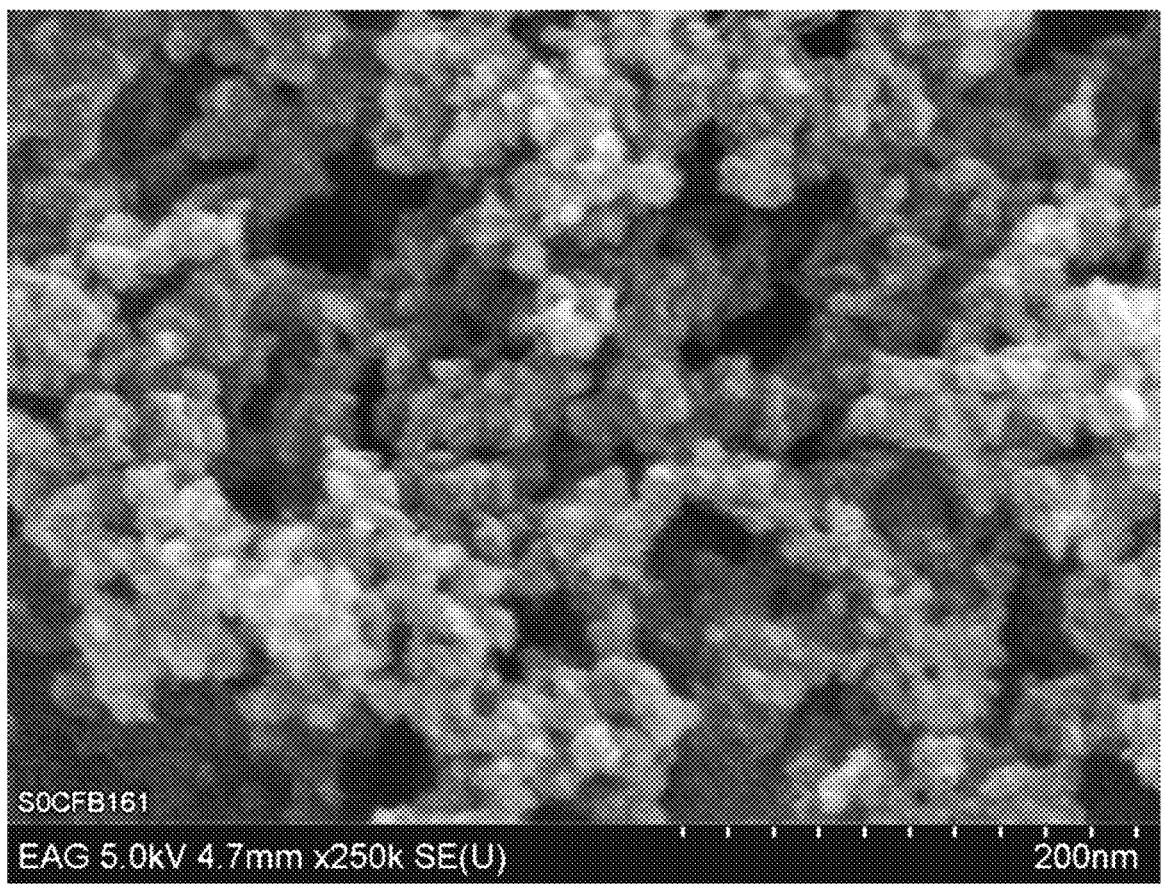
Figure 16A:
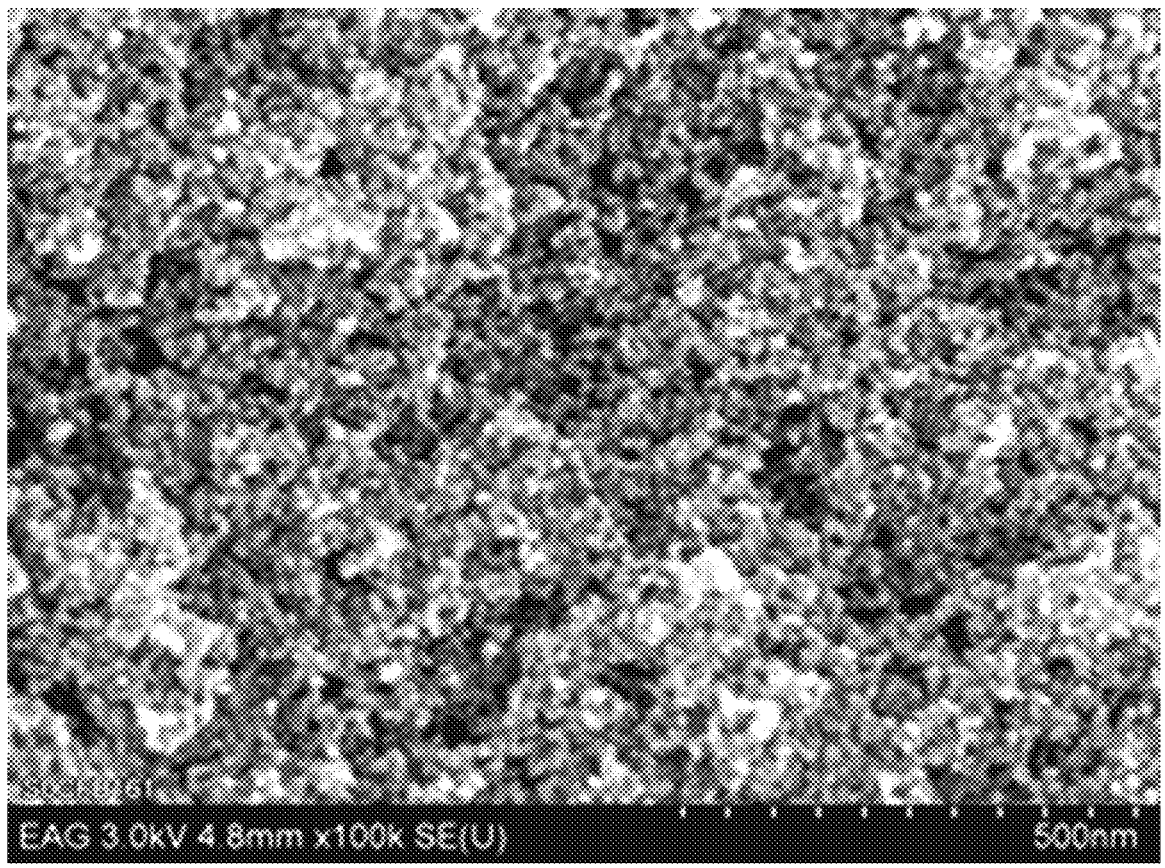
FIG. 16A and FIG. 16B show SEM photographs of 5.0/5.0, which has a high apparent density (0.2188 $g/cm^3$) and a low skeletal density (1.7226 $g/cm^3$). The monolithic silica aerogel was prepared by the standard process (magnification.
Figure 16B:
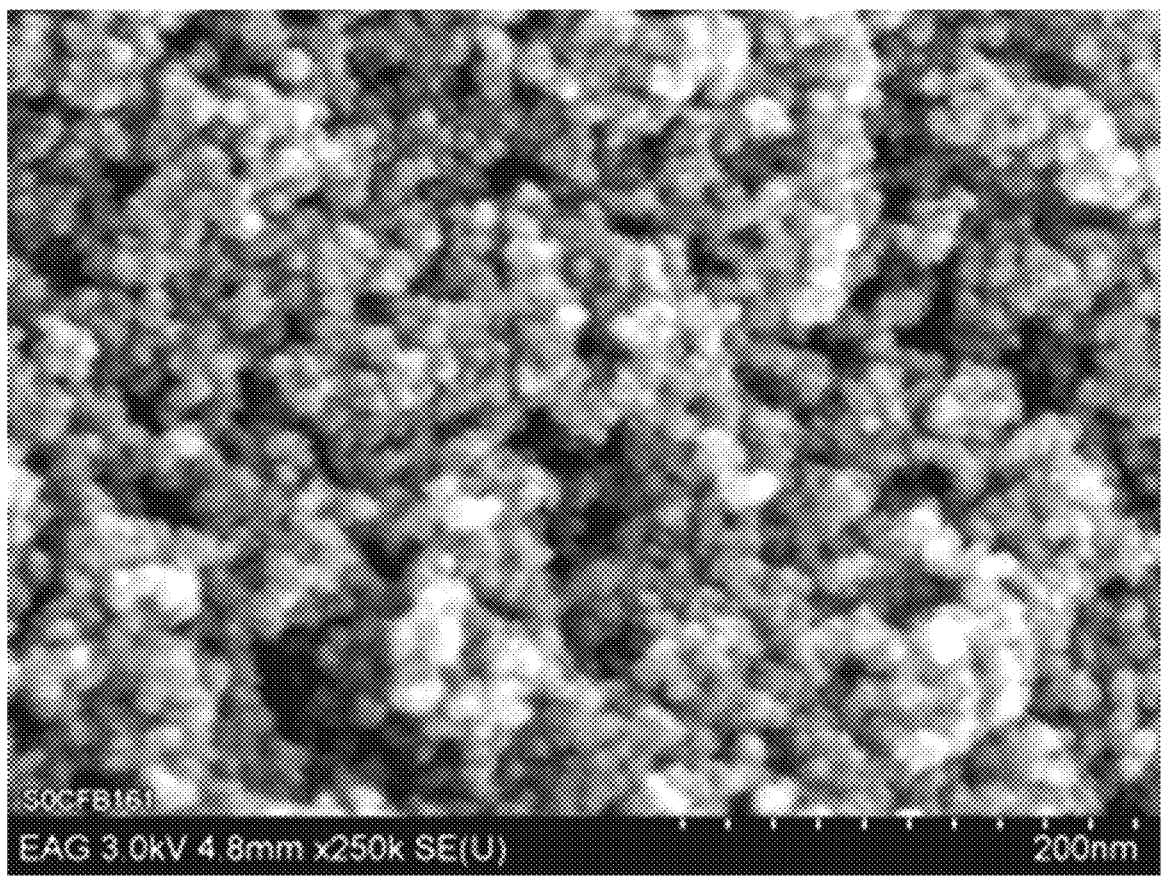

In addition to the measurements that have been discussed, scanning electron microscope (SEM) images of some of the monolithic silica aerogel samples produced with the standard process in this example give more insight regarding the characterization results. FIG. 15A and FIG. 15B show SEM photographs of 1.5/8.5, which has a low apparent density 0.0529 g/cm³ and a high skeletal density of 2.2150 g/cm³ (magnification: FIG. 15A: 50,000, FIG. 15B: 250,000). In comparison, FIG. 16A and FIG. 16B show SEM photographs of 5.0/5.0, which has a high apparent density of 0.2188 g/cm³ and a low skeletal density of 1.7226 g/cm³. The overall space (pores) of the aerogel network was larger in the sample with the low apparent density as compared to that with the higher apparent density case (see the photos of low magnifications), even considering the differing magnifications, which were necessary to obtain the best quality images. This suggests that the corresponding aerogel has a relatively higher porosity On the contrary, photos of both aerogels at high magnification (1:250,000) show how the silica backbones were formed. The crosslinks are made from highly irregular shapes of silica spheres that create relatively fewer voids between themselves, and it causes the corresponding aerogel to exhibit a higher skeletal density. We can see how homogeneously the silica spheres are formed and cross-linked with each other in FIG. 16A and FIG. 16B. This unique morphology is evidence that the corresponding silica aerogel monolith has higher transparency, as it provides higher chance for the pores to be more uniformly sized.

Effects of Processing Conditions on Porosity.

Changes were made to some of the process parameters for another series of silica aerogels which were synthesized in order to investigate the influence of these processing conditions on the resulting textural properties, mainly focusing on the porosity. Different catalysts for the DCM step, and several combinations of gelation diluents were employed and the produced silica aerogels were compared side by side with the sample prepared by the standard process (3.0/7.0).

Effects of Solvent Types on Porosity.

Methanol and ethanol-water mixtures replaced the ethanol in the gelation step as a diluent while all other parameters remained identical to those in the standard process at a target density of 0.0582 g/cm³. As illustrated in Table 11, all solvents produced higher apparent densities and higher skeletal densities, as well as increased gelation times compared to the standard sample.

TABLE 11

Effects of solvent types in gelation on densities and porosities of monolithic silica aerogels.

| Sample ID (Solvent Types) (Target Density: 0.0582 g/cm³) | Gel Time (min) | Apparent Density (g/cm³) | Skeleton Density (g/cm³) | Porosity (%) |
|---|---|---|---|---|
| 3.0/7.0) (standard (ethanol)) | 19 | 0.128 | 1.8521 | 93.061 |
| 3.0/7.0ME (methanol + ethanol) | 53 | 0.207 | 2.3620 | 91.267 |
| 3.0/7.0M (methanol) | 82 | 0.204 | 2.4588 | 91.714 |
| 6Et1W ethanol (86 vol %) + water (14 vol %) | 58 | 0.157 | 2.4666 | 93.651 |
| 5Et1W ethanol (72 vol %) + water (28 vol %) | 93 | 0.155 | 2.3063 | 93.299 |

The porosity, on the other hand, was decreased by approximately 2% (from 98.061% to 91.267% or 91.714%) when methanol was employed while those with the ethanol-water mixtures showed no significant difference from that of the standard sample. These results suggest that when methanol is used, the change in the apparent density governs the porosity because the change in the skeletal density is relatively small. When water is added to the conventional diluent (ethanol), on the other hand, the changes in both densities affect the porosity at a similar level and thus the resulting porosities stayed nearly the same as that of the standard one. This can be explained by the fact that esterification controls the formation of the aerogel pores predominantly. This reverse reaction of the poly condensation occurs during and after the gelation due to the presence of solvent with different mother liquor from the precursor (TEOS). This results in the demonstrated differences in the measured densities as well as the longer gelation times compared to that of the standard process. The presence of water in the diluent affects the gelation reaction and the formation of the pores as well because it hinders the overall chemical reactions during the gelation step. The influence, however, is not sufficiently great to change the nature of porosity as observed in Table 11.

Figure 17:
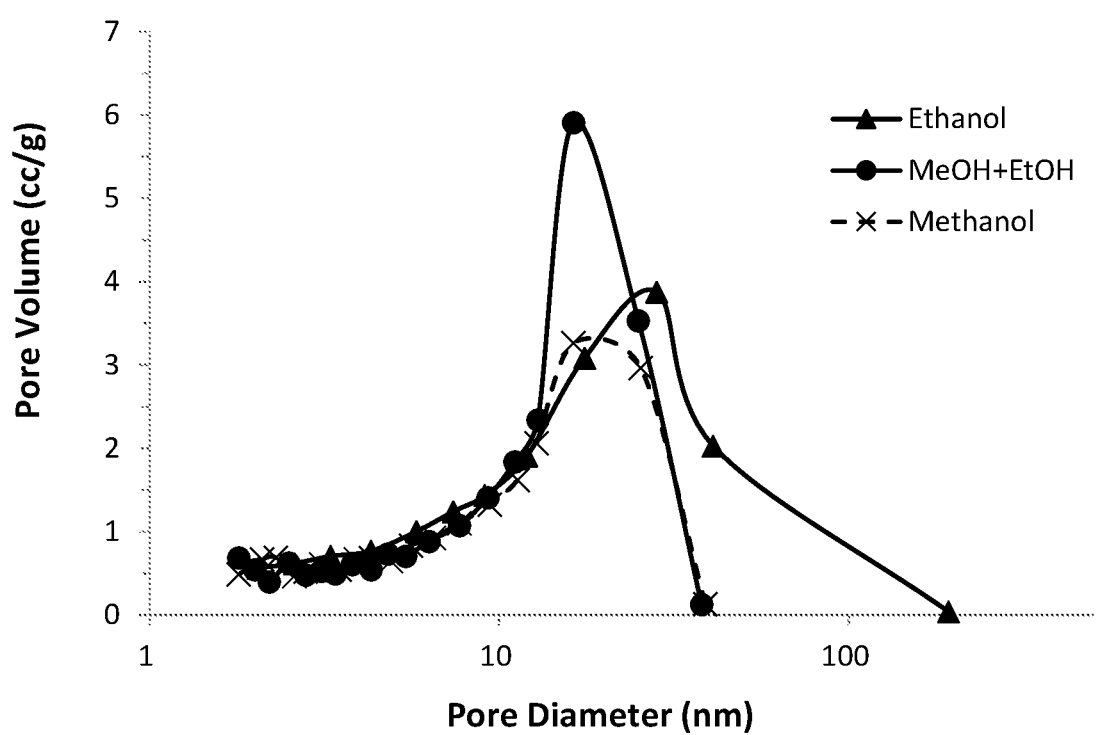
FIG. 17 is a plot showing the effect of solvent types in gelation step on pore size distributions of monolithic silica aerogels. The pre-hydrolyzed sol was prepared by the standard DCM (nitric acid-acetic acid combination).
Figure 18:
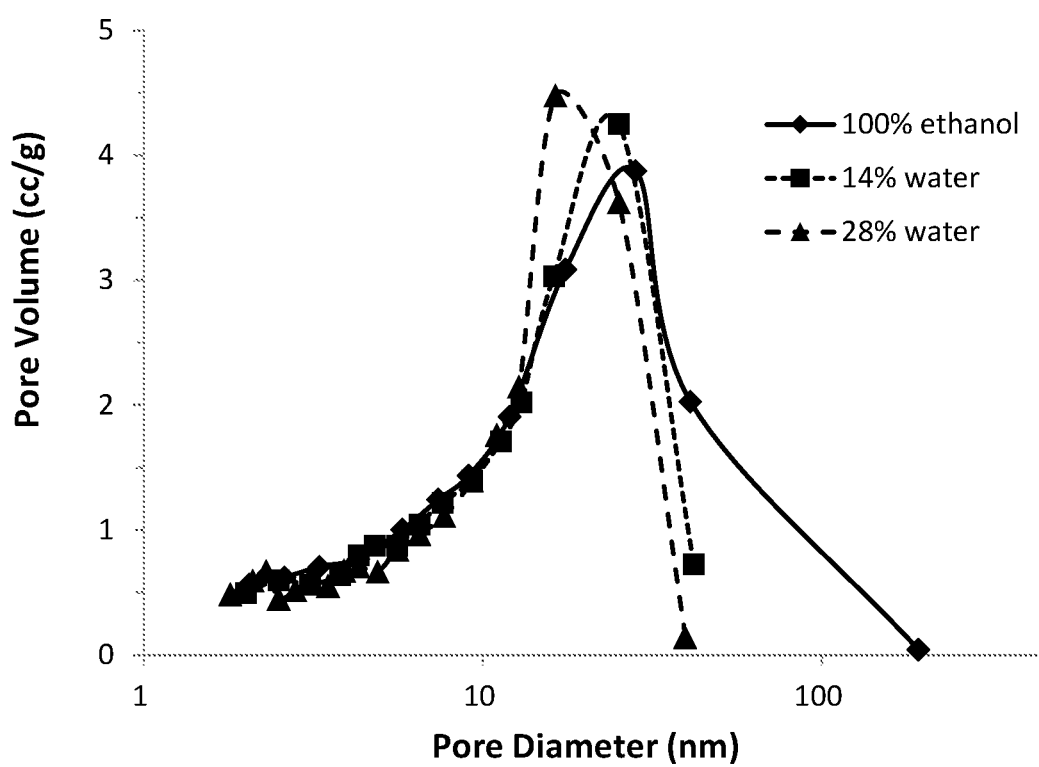
FIG. 18 is a plot illustrating the effect of adding water in the gelation step on the pore size distributions of monolithic silica aerogels. The pre-hydrolyzed sol was prepared by the standard DCM (nitric acid-acetic acid combination).

FIG. 17 shows how the pore size distributions differed between methanol-gelation, methanol-ethanol mixture gelation, and ethanol-gelation. The pore size distribution got narrower and was shifted to smaller sizes when methanol was employed. This difference is also well reflected in the average pore diameters as illustrated in Table 12. FIG. 18 displays the other comparison of the pore size distribution between ethanol-water mixtures and ethanol gelation. While all of the samples using ethanol-water mixtures show quite similar pore size distribution widths, it can be observed that the pore size distribution is slightly decreased with a larger volume % of water in the diluent. Table 12 also shows the surface areas and the pore volumes of the discussed samples with unremarkable differences between them (surface area: 800~950 m²/g, pore volume: 2.02~2.63 cc/g).

TABLE 12

Effects of solvent types on textural properties of monolithic silica aerogels

| Sample ID (Solvent Types) | BET Surface Area (m²/g) | Pore Volume (N₂ Desorption) (cc/g) | Avg. Pore Diameter (nm) |
|---|---|---|---|
| 3.0/7.0) (standard (ethanol)) | 955.2 | 2.63 | 10.33 |
| 3.0/7.0ME (methanol + ethanol) | 903.5 | 2.60 | 10.22 |
| 3.0/7.0M (methanol) | 807.3 | 2.02 | 9.06 |
| 6Et1W ethanol (86 vol %) + water (14 vol %) | 950.0 | 2.61 | 9.72 |
| 5Et1W ethanol (72 vol %) + water (28 vol %) | 884.0 | 2.42 | 9.91 |

Effects of Catalyst Type on Porosity.

The sulfuric acid-acetic acid combination was preliminarily investigated as part of the development journey of the DCM and it was demonstrated that use of this combination works to produce pre-hydrolyzed sol from homogeneous hydrolysis. As illustrated in Table 13, the resulting aerogel has higher apparent density and skeletal density and consequently lower porosity by 2% (91.862% versus 93.061%), along with a considerably longer gelation time when compared to the standard sample. This difference is primarily related to the pH difference of the produced sol. The more acidic sol prepared by the sulfuric acid-acetic acid combination contributes to forming smaller pores in the gel network, which implies thicker growth of the silica networks. This also causes longer gelation times as the gelation takes place under a base catalyzing environment with ammonia as a catalyst.

TABLE 13

Effects of pre-hydrolysis catalyst on densities and porosities of monolithic silica aerogels.

| Pre-Hydrolysis Catalyst (Target Density: 0.0582 g/cm³) | Gel Time (min) | Apparent Density (g/cm³) | Skeleton Density (g/cm³) | Porosity (%) |
|---|---|---|---|---|
| Sample ID: 3.0/7.0 (Nitric Acid-Acetic Acid) | 19 | 0.128 | 1.8521 | 93.061 |
| Sample ID: SA3.0/7.0 Sulfuric Acid-Acetic Acid | 52 | 0.175 | 2.1533 | 91.862 |

Figure 19:
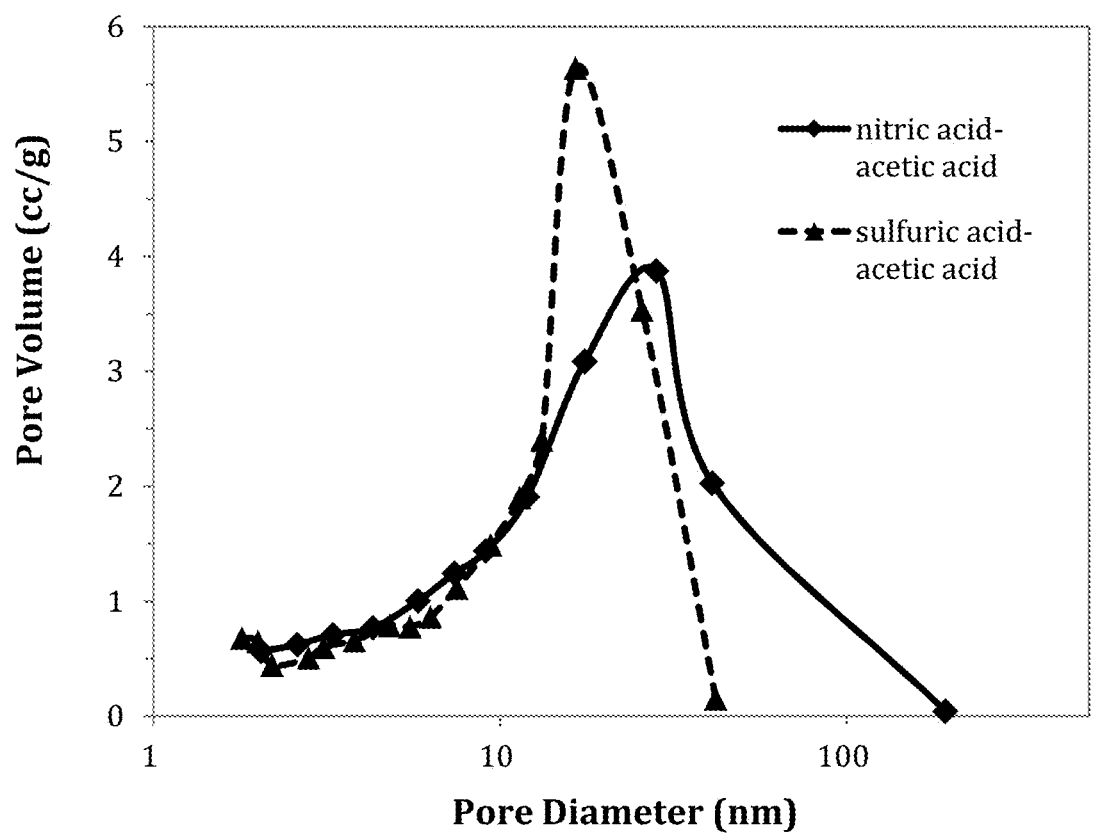
FIG. 19 is a plot showing the change in pore size distribution of silica aerogel synthesized by sulfuric acid-acetic acid combination using the DCM.

FIG. 19 shows the pore size distribution and it also agrees with what is observed from Table 13 as the main pore area is shifted to a smaller size from that of the standard sample. Such characteristic differences, however, are not clearly observed in the textural properties characterized by the N₂ adsorption-desorption method as displayed in Table 14. This is a good example of how accurately the helium pycnometer enables characterization of the extremely nanoporous aerogel structure.

TABLE 14

Effects of pre-hydrolysis catalyst on textural properties of monolithic silica aerogels.

| Pre-Hydrolysis Catalyst (Target Density: 0.0582 g/cm$^3$) | BET Surface Area (m$^2$/g) | Pore Volume (N$_2$ Desorption) (cc/g) | Avg. Pore Diameter (nm) |
|---|---|---|---|
| Sample ID: 3.0/7.0 (Nitric Acid-Acetic Acid) | 955.2 | 2.63 | 10.33 |
| Sample ID: SA3.0/7.0 Sulfuric Acid-Acetic Acid | 934.7 | 2.73 | 10.29 |

Effects of Hydrophobicity on Porosity.

Figure 20A:
FIG. 20A shows a water droplet on a hydrophobic silica aerogel.
Figure 20B:
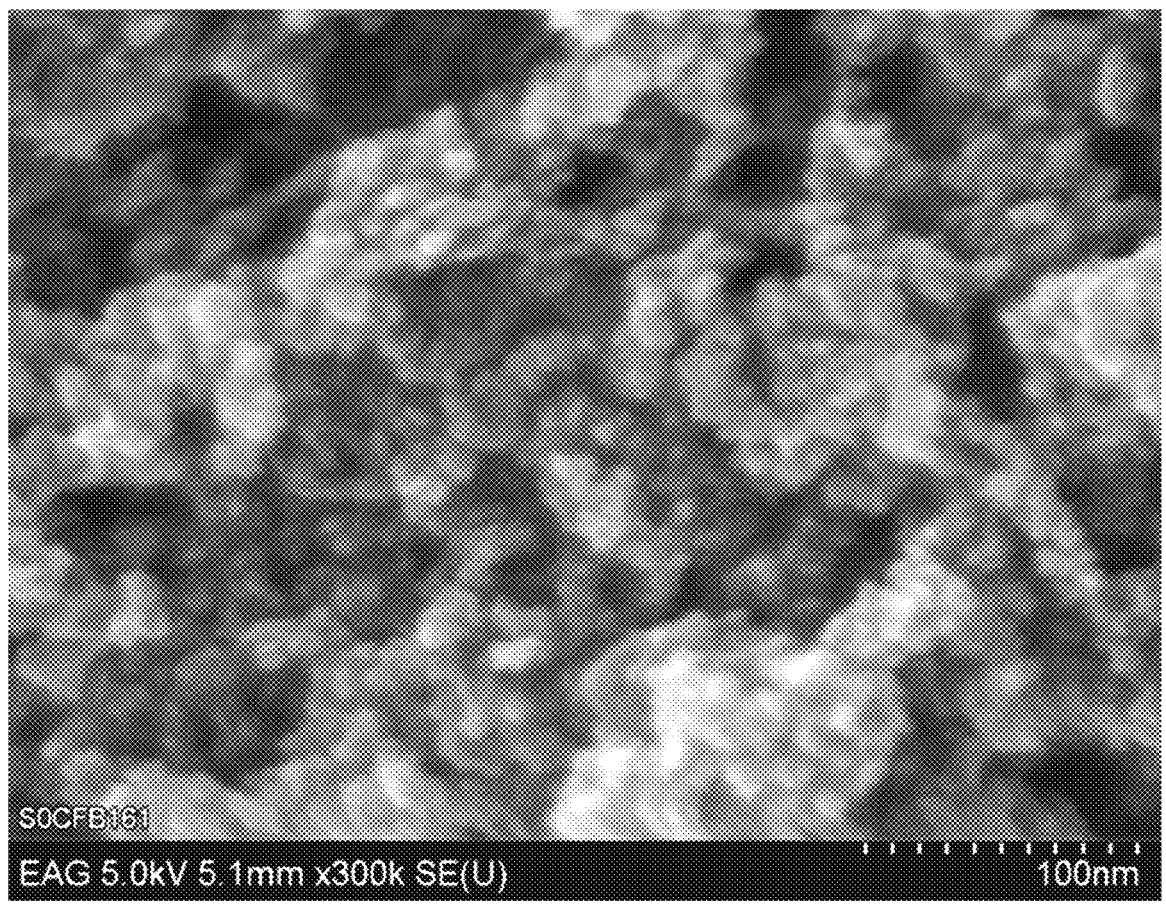
FIG. 20B shows SEM photographs of a hydrophobic silica aerogel (1:300,000).

Hydrophobic silica aerogel was prepared by aging the wet gel in an aging solution prepared using HMDZ (1,1,1,3,3,3-hexamethyldisilazine) diluted in ethanol at 328 K (55° C.) for 6 hours. FIG. 20A and FIG. 20B are photos of the hydrophobic aerogel monolith with water droplets on it (FIG. 20A) and the textural feature of hydrophobic silica aerogel (SEM photo, FIG. 20B). Unlike that of the hydrophilic aerogel shown in FIG. 15A and FIG. 15B, the spaces between the spherical silica particles are filled, resulting in more clustered groups forming in the structure. This is due to the presence of the methyl group that is known to create strong hydrophobicity by replacing the hydroxyl groups of the silanol (SiO(OH)) groups, a remnant of a typical sol-process, which are unstable at the ends of the silica chains.

TABLE 15

Effects of aging treatment for hydrophobicity on densities and porosities of monolithic silica aerogels.

| Sample Property (Target Density: 0.0582 g/cm$^3$) | Gel Time (min) | Apparent Density (g/cm$^3$) | Skeleton Density (g/cm$^3$) | Porosity (%) |
|---|---|---|---|---|
| Sample ID: 3.0/7.0 (Hydrophilic Aerogel) | 19 | 0.128 | 1.8521 | 93.061 |
| Sample ID: HB3.0/7.0 (Hydrophobic Aerogel) | 18 | 0.133 | 1.5311 | 91.266 |

Figure 21:
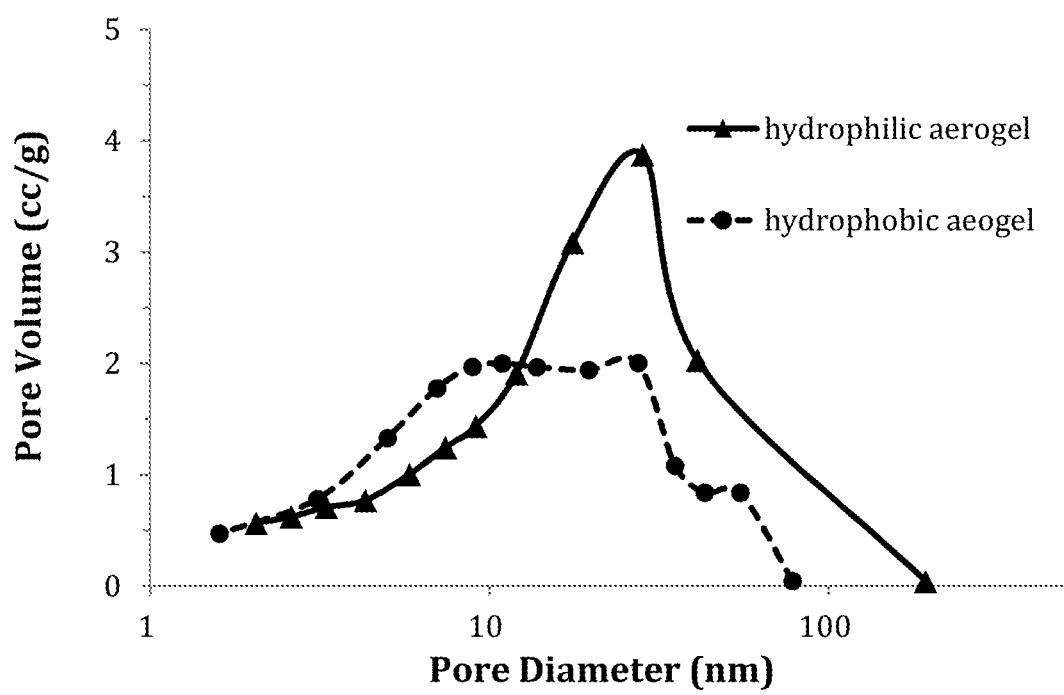
FIG. 21 is a plot showing the change in pore size distribution of a silica aerogel with hydrophobicity.

Table 15 lists gelation times, densities, and porosities of the hydrophobic sample compared to the hydrophilic one (the standard sample). The gelation times recorded were nearly identical because the synthetic route was the same (19 minutes and 18 minutes). While the apparent densities measured showed a negligible difference (0.128 vs 0.133 g/cm$^3$), clear differences were observed from the skeletal densities and this resulted in a 2% lower porosity for the hydrophobic aerogel monolith (91.266% versus 93.061%). Pore size distribution changes can be observed from FIG. 21 The main distribution of the pore sizes becomes broader with a shift toward smaller diameters compared to that of the standard sample. Similar differences are also found in the average pore diameters listed in Table 16 together with the surface areas and the pore volumes, all of which show decreases compared to the hydrophilic one (the standard sample).

TABLE 16

Effects of hydrophobicity on textural properties of monolithic silica aerogels.

| Sample Property (Target Density: 0.0582 g/cm$^3$) | BET Surface Area (m$^2$/g) | Pore Volume (N$_2$ desorption) (cc/g) | Avg. Pore Diameter (nm) |
|---|---|---|---|
| Sample ID: 3.0/7.0 (Hydrophilic Aerogel) | 955.2 | 2.63 | 10.33 |
| Sample ID: HB3.0/7.0 (Hydrophobic Aerogel) | 877.2 | 2.17 | 8.16 |

CONCLUSIONS

A series of monolithic silica aerogels were produced using the two-step sol-gel process, an aging step, and the CO$_2$ supercritical drying process (the COLD method). The newly developed pre-hydrolysis method (direct contact method, DCM) was successfully applied to the two-step sol-gel route and demonstrated great feasibility for enabling tuning of the synthetic conditions to achieve a desired target property of the silica aerogel texture, specifically in terms of the porosity. The solvent type at the gelation step, the catalyst type for the DCM process, and the aging treatment used to establish hydrophobicity in the aerogel all affect the porosity of the produced aerogel, as well as other textural properties. This example demonstrates that a silica aerogel with a desired porosity can be obtained by appropriately adjusting the processing parameters. With this ability to control porosity, once can readily optimize the thermal conductivity of the produced silica aerogel for specific applications with minimal effort. This makes employing the DCM in the aerogel production process highly desirable.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for preparing a porous metal oxide material comprising:
   (i) reacting a metal alkoxide with water in the presence of a catalyst system to form a partially hydrolyzed sol, wherein the catalyst system comprises a strong acid and a weak acid;
   (ii) contacting the partially hydrolyzed sol with a base catalyst and an alcohol to form a precursor gel; and
   (iii) drying the precursor gel to form the porous metal oxide material;
   wherein the weak acid and the strong acid are present in a molar ratio of weak acid:strong acid of from 1:1 to 200:1.

2. The method of claim 1, wherein the weak acid and the strong acid are present in a molar ratio of weak acid:strong acid of from 4:1 to 70:1.

3. The method of claim 1, wherein the weak acid comprises acetic acid.

4. The method of claim 1, wherein the strong acid comprises nitric acid, sulfuric acid, or a combination thereof.

5. The method of claim 1, wherein the metal alkoxide comprises a silicon alkoxide.

6. The method of claim 5, wherein the silicon alkoxide is selected from the group consisting of tetramethoxysilane, tetraethoxysilane, tetrapropoxysilane, tetrabutoxysilane, and combinations thereof.

7. The method of claim 5, wherein the partially hydrolyzed sol comprises at least 10 wt % silica, based on the total weight of the partially hydrolyzed sol.

8. The method of claim 1, wherein the water and the metal alkoxide are present in a molar ratio of water:metal alkoxide of from 2:1 to 5:1.

9. The method of claim 1, wherein step (i) comprises reacting the metal alkoxide with the water in the presence of the catalyst system at a temperature of 50° C. or less.

10. The method of claim 9, wherein step (i) comprises reacting the metal alkoxide with the water in the presence of the catalyst system at room temperature.

11. The method of claim 1, wherein the base comprises ammonium hydroxide.

12. The method of claim 1, wherein the alcohol comprises methanol, ethanol, propanol, butanol, or any combination thereof.

13. The method of claim 1, wherein step (ii) comprises contacting the partially hydrolyzed sol with the base catalyst and the alcohol for a period of less than three hours at room temperature.

14. The method of claim 1, wherein the method further comprises aging the precursor gel.

15. The method of claim 1, wherein the method further comprises rinsing the precursor gel.

16. The method of claim 1, wherein the precursor gel comprises a film, a polymeric gel, or a colloidal gel.

17. The method of claim 1, wherein drying the precursor gel comprises supercritically drying the precursor gel.

18. The method of claim 17, wherein the method further comprises calcining the supercritically dried precursor.

19. The method of claim 1, wherein the porous metal oxide material comprises a metal oxide aerogel.

* * * * *